US012784575B2

(12) United States Patent
Kelly

(10) Patent No.: US 12,784,575 B2
(45) Date of Patent: Nov. 3, 2026

(54) INTELLIGENT FIRE AND OCCUPANT SAFETY SYSTEM AND METHOD

(71) Applicant: Firesapien Technologies Ltd, Wokingham (GB)

(72) Inventor: Andrew Leslie Kelly, Wokingham (GB)

(73) Assignee: Firesapien Technologies Ltd, Wokingham (GB)

( * ) Notice: Subject to any disclaimer, the term of this patent is extended or adjusted under 35 U.S.C. 154(b) by 10 days.

(21) Appl. No.: 18/294,671

(22) PCT Filed: Jun. 27, 2022

(86) PCT No.: PCT/GB2022/000061
§ 371 (c)(1),
(2) Date: Feb. 2, 2024

(87) PCT Pub. No.: WO2023/017232
PCT Pub. Date: Feb. 16, 2023

(65) Prior Publication Data
US 2024/0339026 A1 Oct. 10, 2024

(30) Foreign Application Priority Data
Aug. 7, 2021 (GB) ...................................... 2111415

(51) Int. Cl.
*G08B 31/00* (2006.01)
*G08B 7/06* (2006.01)
(Continued)

(52) U.S. Cl.
CPC ............ *G08B 31/00* (2013.01); *G08B 7/066* (2013.01); *G08B 17/117* (2013.01); *G08B 21/02* (2013.01); *G08B 21/22* (2013.01)

(58) Field of Classification Search
CPC ...... G08B 31/00; G08B 7/066; G08B 17/117; G08B 21/02; G08B 21/22
See application file for complete search history.

(56) References Cited

U.S. PATENT DOCUMENTS 4,737,769 A 4/1988 Masot
7,690,837 B2 * 4/2010 Ahlers ............... G01M 99/002
374/135

(Continued)

FOREIGN PATENT DOCUMENTS

CA 2061508 C 11/2000
CA 3033481 A1 2/2017

(Continued)

OTHER PUBLICATIONS

International Preliminary Report on Patentability for PCT/GB2022/000061, mailed Nov. 16, 2023 (10 pages).

(Continued)

*Primary Examiner* — Hoi C Lau
(74) *Attorney, Agent, or Firm* — Robinson IP Law, PLLC

(57) ABSTRACT

The described invention relates to a computer-implemented method for determining fire safety and occupant safety information, comprising: receiving data from a plurality of Appliances, each equipped with thermal sensors, carbon dioxide detectors and real-time voice communication capabilities, arranged within a building and configured to detect locations of elevated temperature and ambient carbon dioxide levels within the building; wherein one or more of said Appliances are arranged to detect elevated temperatures and levels of carbon dioxide indicative of the presence or risk of fire, and one or more of said Appliances are arranged to detect elevated temperatures indicative of body heat and carbon dioxide levels indicative of respiration and therefore (Continued)

the presence of one or more people, and enabling communication between occupants and a remote person to determine any special medical priorities of said occupants; analysing the received data to determine a first location corresponding to the presence or risk of fire and a second location corresponding to the presence of one or more people; using data corresponding to the first and second locations to construct virtual (i.e., computer-generated) dynamic real-time models of the current state of the fire and probabilistic models of the likely physical development of the fire, and by reference to pre-determined policies defining courses of action to be taken in different fire hazard scenarios, communicating and representing data according to the appropriate policy response. Furthermore, proposed firefighting interventions can be sent as data to the processing unit and the impact of such interventions can be included in the probabilistic fire models, enabling real-time simulation of the impact of said proposed interventions and interpretation of the likely results, using machine learning to improve the accuracy of the simulations. In this way, evacuation priorities and firefighting methods can be better targeted and occupants can be more safely evacuated from the building; resulting in reduced injury risk for occupants and firefighters due to enhanced intelligence on the status and likely development of the fire.

15 Claims, 14 Drawing Sheets

(51) Int. Cl.

| | |
|---|---|
| ***G08B 17/117*** | (2006.01) |
| ***G08B 21/02*** | (2006.01) |
| ***G08B 21/22*** | (2006.01) |

(56) References Cited

U.S. PATENT DOCUMENTS

| | | | | |
|---|---|---|---|---|
| 7,782,197 | B2 * | 8/2010 | Lang | G08B 17/00<br>340/541 |
| 7,969,296 | B1 * | 6/2011 | Stell | G08B 25/10<br>340/522 |
| 8,540,421 | B2 * | 9/2013 | Ahlers | G01M 99/002<br>374/135 |
| 9,232,040 | B2 * | 1/2016 | Barash | G08B 25/016 |
| 9,355,062 | B2 * | 5/2016 | Marshall | A62C 37/50 |
| 9,679,255 | B1 * | 6/2017 | Mullaly | G08B 29/188 |
| 10,885,763 | B2 * | 1/2021 | Gerbus | G08B 21/182 |
| 12,447,366 | B2 * | 10/2025 | Ezra | A62C 31/28 |
| 2005/0110633 | A1 | 5/2005 | Lovell et al. | |
| 2009/0033500 | A1 * | 2/2009 | Malik | A62B 99/00<br>340/572.1 |
| 2009/0128327 | A1 * | 5/2009 | Lang | G08B 29/26<br>340/541 |
| 2009/0288846 | A1 * | 11/2009 | Leblanc | A62C 35/645<br>169/17 |
| 2010/0004891 | A1 * | 1/2010 | Ahlers | G01M 99/002<br>374/E3.001 |
| 2010/0098131 | A1 * | 4/2010 | Ahlers | G01M 99/002<br>374/8 |
| 2010/0295677 | A1 * | 11/2010 | Egawa | G08B 25/009<br>340/540 |
| 2011/0117878 | A1 * | 5/2011 | Barash | G16H 40/20<br>340/539.12 |
| 2013/0181617 | A1 * | 7/2013 | Maddox | H05B 47/115<br>315/159 |
| 2015/0077240 | A1 | 3/2015 | Eck | |
| 2015/0163411 | A1 | 6/2015 | McCarthy, III et al. | |
| 2015/0163412 | A1 * | 6/2015 | Holley | G05B 15/02<br>348/143 |
| 2016/0110980 | A1 * | 4/2016 | Aggarwal | G01J 5/10<br>250/338.5 |
| 2016/0225243 | A1 * | 8/2016 | Albass | G08B 25/10 |
| 2017/0032632 | A1 * | 2/2017 | Joseph | H04W 4/90 |
| 2017/0287309 | A1 | 10/2017 | Gerbus et al. | |
| 2017/0337485 | A1 | 11/2017 | Mullaly et al. | |
| 2018/0293864 | A1 | 10/2018 | Wedig et al. | |
| 2019/0066464 | A1 | 2/2019 | Wedig et al. | |
| 2020/0155881 | A1 * | 5/2020 | Tohidi | G06F 16/9038 |
| 2020/0155882 | A1 * | 5/2020 | Tohidi | G06N 7/01 |
| 2020/0225313 | A1 | 7/2020 | Coles | |
| 2020/0240802 | A1 | 7/2020 | Correnti et al. | |
| 2020/0327202 | A1 | 10/2020 | Tran et al. | |
| 2021/0056820 | A1 | 2/2021 | Derickson | |
| 2021/0110691 | A1 | 4/2021 | Tero | |
| 2021/0201635 | A1 * | 7/2021 | Fernandez-Orellana | G08B 7/066 |
| 2021/0248281 | A1 * | 8/2021 | Fernandez-Orellana | G06F 30/13 |
| 2023/0124927 | A1 * | 4/2023 | Ezra | A62C 37/40<br>169/61 |
| 2023/0233890 | A1 * | 7/2023 | Chandler | A62C 35/02<br>340/525 |
| 2024/0339026 | A1 * | 10/2024 | Kelly | G08B 17/12 |

FOREIGN PATENT DOCUMENTS

| | | | |
|---|---|---|---|
| CN | 201408467 | Y | 2/2010 |
| CN | 102682562 | A | 9/2012 |
| CN | 103310579 | A | 9/2013 |
| CN | 109033716 | A | 12/2018 |
| CN | 110956563 | A | 4/2020 |
| CN | 210865010 | U | 6/2020 |
| CN | 111862518 | A | 10/2020 |
| CN | 214621298 | U | 11/2021 |
| EP | 3031039 | B1 | 7/2017 |
| GB | 2487212 | A | 7/2012 |
| GB | 2578238 | A | 4/2020 |
| GB | 2616881 | B | 3/2024 |
| JP | H07182585 | A | 7/1995 |
| KR | 101758349 | B1 | 7/2017 |
| KR | 101833794 | B1 | 3/2018 |
| KR | 101867923 | B1 | 6/2018 |
| KR | 101895726 | B1 | 9/2018 |
| KR | 102013894 | B1 | 8/2019 |
| KR | 20200013218 | A | 2/2020 |
| KR | 102275989 | B1 | 7/2021 |
| RU | 2000129649/09 | A | 11/2000 |
| WO | 93/20544 | A1 | 10/1993 |
| WO | 2009/039647 | A1 | 4/2009 |
| WO | 2015/129055 | A1 | 9/2015 |
| WO | 2019/165422 | A1 | 8/2019 |
| WO | 2020/031006 | A1 | 2/2020 |
| WO | 2021/003140 | A1 | 1/2021 |

OTHER PUBLICATIONS

United Kingdom Examination Report for GB2111415.2, issued Aug. 8, 2023 (4 pages).
United Kingdom Search Report for GB2111415.2, issued Oct. 29, 2021 (2 pages).
United Kingdom Examination Report for GB2111415.2, issued Jul. 18, 2022 (7 pages).
United Kingdom Search Report for GB2117938.7, issued Jan. 13, 2022 (2 pages).
United Kingdom Search Report for GB2201517.6, issued Mar. 30, 2022 (2 pages).
United Kingdom Search Report for GB2201956.6, issued Apr. 7, 2022 (2 pages).
United Kingdom Search Report for GB2205619.6, issued Sep. 15, 2022 (2 pages).
United Kingdom Search Report for GB2206405.9, issued Sep. 23, 2022 (2 pages).
United Kingdom Search Report for GB2212173.5, issued Oct. 13, 2022 (2 pages).
United Kingdom Search Report for GB2304579.2, issued Aug. 29, 2023 (2 pages).

(56) References Cited

OTHER PUBLICATIONS

United Kingdom Examination Report for GB2212173.5, issued Apr. 29, 2024 (4 pages).
United Kingdom Examination Report for GB2304579.2, issued Apr. 29, 2024 (4 pages).

* cited by examiner

AN INTELLIGENT FIRE & OCCUPANT SAFETY SYSTEM & METHOD: DRAWINGS

FIGURE 1

2019/20
Total dwelling fires

| Spread of fire | Dwelling Type: Purpose Built Medium Rise (4-9) Flats | Dwelling Type: Purpose Built High Rise (10+) Flats |
|---|---|---|
| **Total** | **1,902** | **775** |
| Limited to item 1st ignited | 824 | 307 |
| Limited to room of origin | 458 | 179 |
| Limited to floor of origin | 101 | 49 |
| Limited to 2 floors | 21 | 1 |
| Affecting more than 2 floors | 8 | 3 |
| Whole building | 2 | 0 |
| Roofs and roof spaces[6] | 7 | 4 |
| No fire damage[7] | 481 | 232 |

1 Dwelling fires are fires in properties that are a place of residence i.e.places occupied by households such as houses and flats, excluding hotels and residential institutions 2 Spread of fire is defined as the extent of flame and heat damage only at the fire's stop. This does not include smoke or other damage shows the time-temperature curve of the ISO 834 standard fire in the fire tests. The maximum duration of the tests was 3 hours.

From underneath (if mounted on ceiling)

Side-Elevation: Multi-Occupancy Building

Pre-Operational Stage:

Figure 10B Post-Deployment Operational Stage & Scenarios
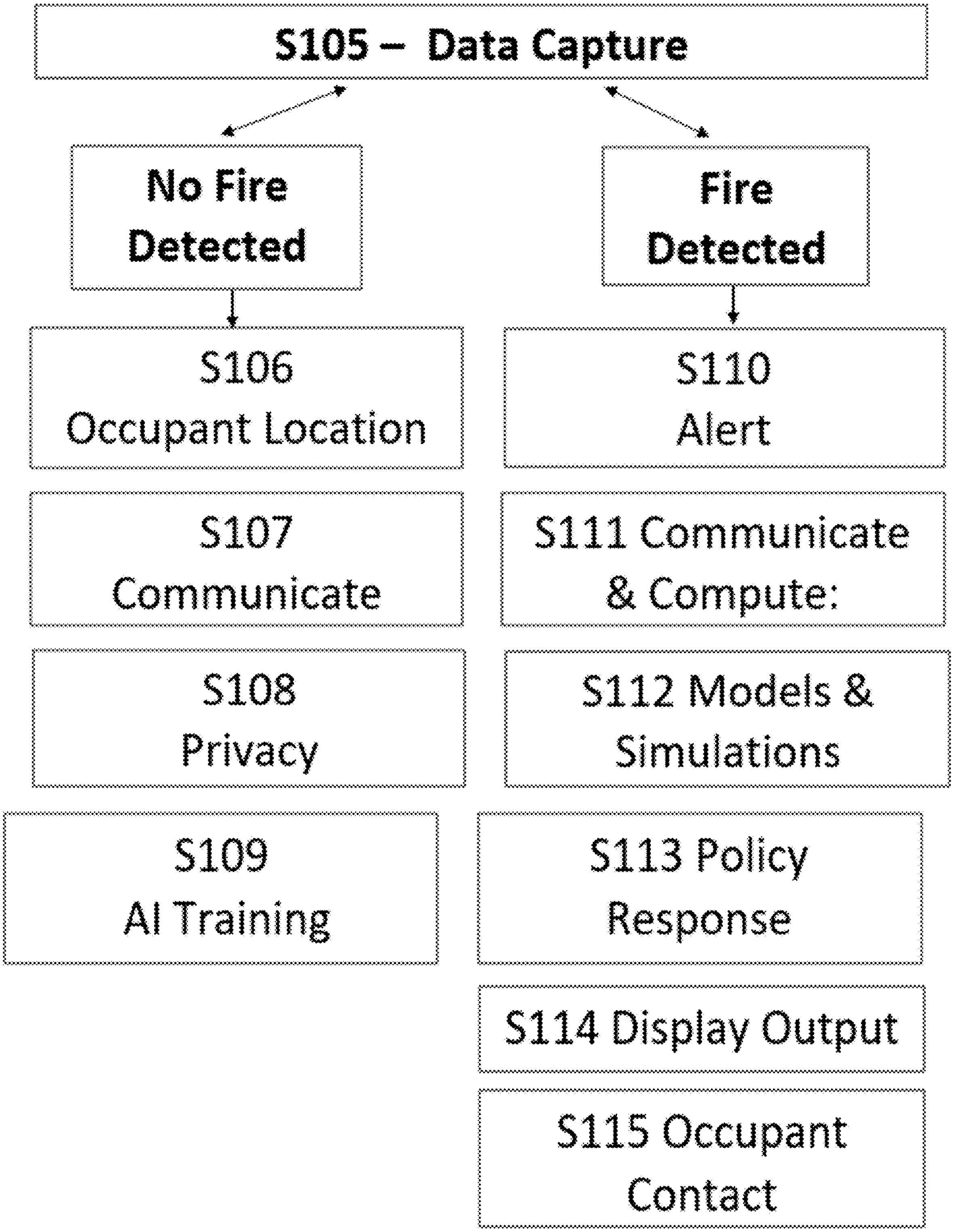

INTELLIGENT FIRE AND OCCUPANT SAFETY SYSTEM AND METHOD

BACKGROUND

The Grenfell Tower tragedy of 14 Jun. 2017 was a prime example of the complexities and dangers of firefighting in a Medium-Rise and High-Rise (hereinafter referred to as "MRHR") multi-occupancy environment. In addition to the large number of existing MRHR residences, there are also multi-storey hotels and office blocks of various ages and fire safety conditions across the UK and developed countries.

As urban populations increase, an increasing number of people live in multiple occupancy buildings such as purpose-built blocks of flats; in most of the UK, the majority of these buildings do not include communal fire alarms, which poses a challenge in ensuring the safety of the residents in the event of a fire breaking out.

Some multiple occupancy buildings may choose to employ a "waking watch" service, where staff manually patrol the building in order to detect fires and raise the alarm, if necessary. However, such services are expensive and inefficient.

Grenfell Tower tragedies are, thankfully, quite rare; MRHR fires are not.

FIG. 1 (extract from "Dwelling fires by dwelling type and spread of fire", source Home Office), shows that in the 12 months to end September 2020, there were 2,677 MRHR fires in England alone, any of which could have been another Grenfell, circumstances permitting. Of these 2,677 MRHR fires:

- 193 fires spread outside the residence to damage at least one storey of the building in question ("communal" fires, which are the most dangerous)
- Of the 193 communal fires, 43 affected multiple storeys or the whole building and were the most serious MRHR fire threats
- This means almost 1 in 4 MRHR fires, once it has escaped the compartment of origin, goes on to threaten the entire building It is clear that the detection and mitigation of "communal" fires in MRHR multi-occupancy buildings deserves special attention.

In addition to the above-mentioned threats of fire, the Grenfell Tower Phase 1 Report (the "Grenfell Report") highlighted multiple system and information factors which hampered the efforts of the Fire & Rescue Services ("FRS") to fight the fire and manage the evacuation as efficiently as possible.

The Grenfell Report recommended that all Responsible Authorities for MRHR buildings store building layouts and plans in electronic form, which can be easily accessed by FRS commanders; they also recommended more effective communications between the control rooms and the firefighting bridgehead, and between the control rooms and individual residents.

It was also clear from the Grenfell Report that intelligence on the internal spread of the fire and the distribution of the occupants in relation to the fire was lacking, and that this lack of information contributed directly to some of the tragic deaths.

The nub of the problem is therefore a lack of information available to FRS commanders and bridgehead personnel, when faced with an MRHR fire. This lack of information extends to; the status of the fire; the likely evolution and development of the fire; the distribution of occupants in relation to the foregoing fire threats; the layout of the building, its construction materials and methods; information on the medical condition, and associated rescue priorities, of the residents.

It is essentially a problem involving the following challenges; data capture, data processing, data modelling and data communication in the situation of a live MRHR fire; such modelling is computationally complex and intensive.

There is therefore the need for a system to improve the safety of building occupants and the efficiency of firefighting interventions in the event of a fire, particularly an MRHR fire in multiple occupancy buildings, by capturing and processing key information outlined in the foregoing and developing an improved system for real-time response in the case of MRHR fire emergencies.

SUMMARY OF THE INVENTION

In accordance with a first aspect of the invention there is provided a computer-implemented method for determining fire safety and occupant safety information, comprising: receiving data from a plurality of fire and occupant safety Appliances (hereinafter referred to as the "Appliance" or the "Appliances"), each equipped with thermal sensors and carbon dioxide sensors arranged within a building and configured to detect locations of elevated temperature and ambient carbon dioxide levels within the building and furthermore each comprising the necessary apparatus to enable real-time voice and data communications between one or more Appliances and between the Appliances and one or more remote devices; wherein one or more of said Appliances are arranged to detect elevated temperatures and levels of carbon dioxide indicative of the presence or risk of fire, and one or more of said Appliances are arranged to detect elevated temperatures indicative of body heat and carbon dioxide levels indicative of respiration and therefore the presence of one or more people; analysing the received data to determine a first location corresponding to the presence or risk of fire and a second location corresponding to the presence of one or more people; using the data corresponding to the first and second locations to construct virtual (i.e., computer-generated) dynamic real-time models of both the current state (current-state models) of the fire and probabilistic models of the likely physical development of the fire and, by reference to pre-determined policies defining courses of action to be taken in different fire hazard scenarios, communicating and representing data according to the appropriate policy response. Furthermore, the probabilistic fire models are configured so as to be able to incorporate data regarding proposed firefighting interventions, thus enabling the real-time simulation of said interventions within the probabilistic models, in order to simulate the likely result of said interventions on a live fire; through the application of machine learning tools, the probabilistic models could automatically be configured to simulate and recommend firefighting interventions, based on the results of the simulations. Furthermore, the Appliances are capable of enabling direct real-time voice communication between persons at the second location and a control room or remote system; this enables the emergency services to verify the number and medical condition of persons at the second location and identify possible medical priorities (e.g., asthma, mobility issues), which may better inform evacuation and rescue plans. In this way, evacuation priorities and firefighting interventions can be better targeted and occupants can be more safely evacuated from the building;

resulting in reduced injury risk for occupants and firefighters due to enhanced intelligence on the status and likely development of the fire.

Key to the ability to accurately capture local and relevant data is the recognition of the fact that fires and humans both produce the same two things as part of their natural processes, being heat and carbon dioxide (either combustion or respiratory related), above normal ambient levels. By recognising this fact and building a common set of detectors for both heat and carbon dioxide, it is possible to accurately and economically capture the signatures indicative of the presence of both fire and people and to model the data with computers, to assist with real-time decisions; the modelling of fire hazards in real-time is now a reality with the advent of "elastic" Cloud Computing in conjunction with Artificial Intelligence tools and techniques.

By creating a platform which can address these computational challenges on a global scale through cloud-computing, combined with the simultaneous two-signature (heat and carbon dioxide) detection of fires and persons at a local level in an actual emergency, by common detectors, the invention makes significant progress over current known practices.

The present invention is able to map the distribution and likely evolution of a fire hazard within a building, together with the locations of the building occupants. The communication of these data points, for example in the form or an alert or to provide critical location data for emergency services arriving at the building, thereby increases the safety of occupants within a building in the event of a fire.

The ability to capture and model information regarding the development of the physical (heat, temperature, flame) and chemical (smoke, gas) by-products of fires are best handled by Computational Fluid Dynamic ("CFD") algorithms and these are computationally intensive and demanding; the scalable nature of elastic cloud computing, which can scale to handle virtually any computational demand within a fraction of a second, combined with the advantages of machine learning and the ability to "train" AI in its interpretation and modelling of data, mean that real-time probabilistic modelling of the development of a live fire is, for the first time, a practical possibility; given this, it is the appropriate to consider the modelling of proposed firefighting interventions in advance of deploying said interventions, in order to simulate the likely impact of them on the actual situation at hand. This capability can be either proactive, by means of which the computational platforms can automatically simulate the fire and various pre-loaded firefighting intervention scenarios to see what is most effective and make recommendations or; reactive, by means of which the computational platform can simulate the result of a particular intervention which is proposed by the Emergency Services.

Such a capability means that firefighters can have unrivalled knowledge of the status and likely path of the fire, the location of people, the safest routes to evacuate, the medical priorities regarding rescue and evacuation and the ability to quickly simulate, in real time, the likely impact of different firefighting interventions in order to optimise them.

CFD fire modelling is not a new concept for the design of new buildings, but what is novel, in this aspect of the invention, is the application of such models to real-time information from a live fire, on the fire itself and the occupants under threat, such that the fire can be constantly monitored, the current-state and probabilistic models constantly updated and refined using machine learning applied to a constant stream of fire and occupant information, during the actual fire, and communicated to firefighters at the bridgehead and commanders in the control room.

In order to achieve the above, it is of course necessary to also have a plan and layout of the building, including (but not limited to) all information relating to the construction methods, construction materials, thicknesses of compartment walls and boundaries, scope and nature of installed fire detection, mitigation and evacuation systems (if any), in electronic form and this then complies with many of the recommendations of the Grenfell Report, which is intended to achieve best practice in MRHR firefighting.

Given that MRHR buildings are usually divided into private residential compartments and communal areas, it is necessary to consider the policy impacts of the legitimate privacy concerns of residents regarding the capture of thermal images (which are, in the end, images of people in a non-fire scenario and for which there are obvious privacy questions raised, which must be dealt with by the method of the present invention, for it to be effective and useful).

This is best achieved by the Responsible Authority for the building considering such aspects as part of the policy response required by this method of invention; communal fire alarms are usually not installed in MRHR buildings in the UK because of concerns about constant evacuation (in the event of false alarms), leading to Health & Safety issues in terms of the evacuation of many residents, possible panic, possible hindering of egress of firefighters, possible danger of residents unknowingly heading towards the fire and for this reason, "stay put" is usually the best advice for residents in a MRHR fire, although the Grenfell tragedy was a prime example of when such advice was not the best.

An important aspect of the method of the present invention is that, because the nature and extent of the fire and the distribution of the occupants can be assessed accurately and quickly, it is possible to devise "dynamic" policies for evacuation based on the development of the fire threat (for example, resident alerts and communications can be selectively targeted, in advance of an actual fire, based on whether the fire is restricted to one compartment, or threatens a single storey, or threatens multiple storeys) and this also applies to the representation of body heat images and their associated privacy concerns (for example, the policy may state that, although thermal body heat images are constantly being recorded and analysed by the method of the present invention, such images are not to be visually represented or displayed on remote devices unless there has been a confirmed detection of fire at the building and even then, the display of such body heat images may be restricted to those compartments and storeys most under threat or in order of pre-determined rescue priority). Such considerations are made part of the method of this invention by ensuring that the current-state and probabilistic fire models refer to said policies as part of the means by which they are stored, communicated and represented and that certain actions may be automatically triggered by reference to said policies.

Given the foregoing, the method of the present invention has particular utility in buildings designed for multiple occupancy, such as MRHR accommodation and office buildings, although in principle the invention could be installed in any residence.

The method of the present invention comprises receiving data from the plurality of Appliances and analysing the received data to determine a first location corresponding to the presence or risk of fire and a second location corresponding to the presence of one or more people. Generally, if the elevated temperature and carbon dioxide levels detected at one or more of the thermal sensors is greater than a first predetermined threshold or is within a first predetermined range then this is indicative of the presence or risk of a fire at the location of that Appliance. Similarly, if the elevated temperature or carbon dioxide levels at one or more of the Appliances is greater than a second predetermined threshold or is within a second predetermined range then this is indicative of the presence of one or more people at the location of the Appliance. In this way, in embodiments each Appliance may be able to detect the presence of fire and one or more people.

The data received from each of the Appliances may include a location of the respective Appliance in order that the first and second locations may be determined. Alternatively, the method may comprise accessing a memory storing data of the locations of each of the Appliances arranged within the building, such that data received from each Appliance may be matched to its corresponding location.

In particularly preferred embodiments of the invention, the method further comprises determining a safe route through the building between the second location corresponding to the presence of one or more people and an exit of the building, avoiding the first location and taking into account the likely path of the fire according to the probabilistic fire model (if any), and wherein the step of communicating data comprises communicating the determined safe route. Typically, determining a safe route comprises accessing a memory storing data comprising the layout of the building. In this way, the method of the present invention advantageously utilises the data received from the Appliances in order to generate a safe evacuation route for occupants of the building, who typically will not know the location of the fire and may be confused and alarmed. In particular, the method may comprise determining an evacuation sequence. The method may comprise analysing data received from the Appliances to determine a plurality of locations, each corresponding to the location of one or more people, the method further comprising determining an evacuation sequence including a sequence in which the people at the respective locations should be evacuated.

The method may also comprise verbal communication through the Appliances between a remote system or person and one or more people at the second location or plurality of locations, in order to assess the medical condition of any persons which may affect the priority of rescue or evacuation plans.

The method comprises determining an appropriate evacuation sequence and scope based on a predetermined policy agreed in advance with the responsible authorities. In particular, a policy defining the scope of the resident alert and evacuation sequence should be predetermined in advance; as already stated, this may include privacy policies in relation to the display of thermal images of body heat, detected by the Appliances, in relation to the absence or presence of a fire hazard. The policy may define the details of the hazard necessary to trigger different evacuation events such that the system may automatically implement a series of actions, based on the real-time and probabilistic fire models, for example involving triggering of alerts and information to guide different groups, based on the policy. The policy is preferably predetermined in an accessible memory such that the system may implement a series of actions according to data received from the Appliances and the result of applying the algorithms and machine learning, according to the predetermined policy.

The communicating data may comprise actuating (e.g., by sending a signal to) one or more audible indicators arranged within the building to indicate the determined safe route. Such audible indicators may be in the form of an alarm sounder, for example, or a speaker configured to play a pre-recorded announcement In embodiments, the communicating data may comprise communicating the first and second locations to one or more remote devices (e.g., via a communications device). The communication may be in the form of an alert transmitted to a remote device such as a smart phone or other smart user device to notify the user of the location of the fire hazard (and predicted models of where the fire is heading), and a safe route out of the building. The alert may be in the form of visual and/or audible guides for guiding the user out of the building. The alert is typically communicated over a wireless communications link such as the internet. Examples of such remote devices that may alert a user to take action may be, for example, a smart phone, smart television, voice assistant device or other smart user device.

The first and second locations may be communicated to the one or more remote devices in the form of a determined safe route through the building. Advantageously, in cases where the remote device is in the form of a smart device such as a smart phone, a navigation module of the smart device (e.g., comprising GNSS sensor(s) and inertial sensor(s)) may be utilised in combination with the communicated safe route out of the building in order to guide a user to the building exit.

The method may comprise displaying the determined first and second locations one of the said one or more remote devices in the form of a visualisation of the building, together with a representation of the various fire models. This may be useful for members of the emergency services when planning the correct action to take to reduce the risk of the fire hazard and ensure the safety of the occupants of the building.

It is an important aspect of the method that a detailed structural survey of the building is undertaken prior to the deployment of the Appliances, so as to capture the information described above and to be able to render the information in a 3D digital representation of the layout of the building; such a representation has the benefit of ensuring that the Responsible Authority for the building also complies with the recommendations of the Grenfell Report.

In relation to the identification of the first location (i.e., the location of a fire), the method may comprise two methods of heat measurement, direct and indirect. In the case of direct heat data capture, the measurement of the heat source is made directly by the thermal sensors, typically when the sensors are exposed to a heat source, such as a fire, in the same compartment wherein the sensor is located.

In the case of indirect heat capture, the temperature inside a compartment can be inferred by sensors located outside the apartment; by reference to the heat flux (rate of heat transfer) from the outer wall of the compartment and the temperature of the outer wall, combined with known quantities such as the thickness and the thermal conductivity of the material in the wall, the temperature of the wall inside the compartment can be calculated; such measurements can be aided by data regarding the rate of heat transfer through the wall itself, which can be measured by means of a probe inserted into the fall and fixed to one or more Appliances. The temperature of the outer wall of the compartment can easily be measured by another Appliance, located nearby, equipped with thermal sensors which have a line of sight with the said outer wall, perhaps in an adjoining compartment or adjoining communal area; this helps to estimate the temperature inside the compartment if, for any reason, the Appliances inside the compartment are unable to function or transmit data; the ability to infer the temperature of the inside of the compartment from the outside, using all or any of said means, is aided by the application of machine learning to increase accuracy of measurement.

As discussed above, the method of the present invention may comprise communicating the first and second locations to one or more remote devices. In embodiments, the method may further comprise communicating with a remote device to cause the remote device to perform an action in response to the determined first and second locations. Such a remote device may be, for example, a remotely controlled valve, a router or hub, a docking station for a mobile phone, a fire alarm, a smoke alarm, a sprinkler system or a remotely controlled fire-door, a third-party fire protection system, a third-party building management system or a third-party building evacuation system. For example, the one or more remote devices may be configured to shut down an appliance or mains gas supply in response to the determined first and second locations, in order to minimise further hazard risks. Such a shutdown may be in respect of a particular location (e.g., residence (e.g., flat), floor or even a whole building), based on the determined first and second locations.

The method may further comprise receiving supplementary data from one or more of: a smoke sensor; a gas sensor; a carbon monoxide sensor; a toxic gas sensor which detects the typical gaseous by-products of cellulosic and hydrocarbon combustion; an oxygen sensor; an airflow sensor; a smoke density sensor; a probe inserted into a wall to measure heat transmission through a wall; a Radio Frequency Identification (RFID) antenna and reader arranged within the building and any or all of which may, in some embodiments, be embedded in the same housings as the thermal and carbon dioxide sensors, and wherein the determination of the first location is further based on an analysis of the supplementary data. The use of such supplementary data obtained from additional sensors, in addition to the data received from the thermal and carbon dioxide sensors, allows the method to determine the state of the fire and the combustion processes at the first location (i.e., the location(s) of the fire) more reliably to further refine the output of the probabilistic models and, in the case of the RFID sensors particularly, enables the detection and visual representation in the models of firefighters wearing or carrying appropriate RFID tags, so that the firefighting commanders can see where their resources are deployed at any time.

In the method of the present invention, the comparison of the probabilistic model to the actual continuous evolution of the fire, in real-time, as recorded by the Appliances and incorporating supplementary data will enable the improvement of the probabilistic modelling, in the future, through the application of machine learning.

In the method of the present invention, the probabilistic model can be further configured to automatically, or by request, evaluate a pre-determined range of possible firefighting interventions, so as to simulate their likely impact on the fire and make recommendations to the Emergency Services; in such cases, the application of machine learning to such models is especially important.

In the method of the present invention, the capture of additional supplementary data, as described above, will significantly improve the accuracy of the current-state and probabilistic models of the fire hazard; Computational Fluid Dynamic ("CFD") and other Computational Physics algorithms (for example, plasma dynamics) are the best methods for simulating the likely development of an MRHR fire; these can be incorporated with various standard "fire curve" algorithms, for example the Cellulosic Fire Curve (ISO 834) which is most likely to be relevant to a building fire, and by further reference to data on the construction materials, methods and layout of the building, the most accurate current-state and probabilistic models of the fire can be determined and represented in the various ways previously described. In this way, by the method of the present invention, it is furthermore clearly possible for those in command of the overall firefighting effort at the scene, or in a control room, to propose various firefighting interventions (for example, positive pressure venting in a stairwell) or for the system to be configured to automatically refer to a pre-determined list of potential interventions, such that said intervention plans may be simulated by the analysis and modelling infrastructure as envisaged by the method, in order to evaluate the likely impact of the interventions in real-time and communicate the output of said intervention models back to those responsible for fighting the fire.

Furthermore, the extra data provided by the one or more additional sensors may be used by the emergency services to coordinate their efforts. For example, if the data from a smoke sensor indicates the presence of smoke in a location where people have been detected, the rescue operation may prioritise that location and may make use of the voice communication capabilities of the Appliance to determine medical conditions which may require special priority, such as asthma or mobility issues.

The computer-implemented method of the invention is typically performed in a fire and occupant safety system, which may in embodiments be linked to all or any of third-party fire protection and/or building management and/or building evacuation systems.

In accordance with a second aspect of the invention there is provided a computer readable medium comprising executable instructions that when executed by a computer cause the computer to perform the method of the first aspect of the invention discussed above.

In accordance with a third aspect of the invention there is provided an intelligent fire safety and occupant system comprising a plurality of Appliances, wherein an Appliance is a device comprising a thermal sensor configured to detect locations of elevated temperature within the building, a carbon dioxide sensor to detect ambient levels of carbon dioxide within the building and a means of real-time wireless voice and data communication. One or more of said Appliances are arranged to detect elevated temperatures and ambient carbon dioxide levels indicative of the presence or risk of fire and one or more of said Appliances are arranged to detect elevated temperatures indicative of body heat and/or ambient carbon dioxide levels indicative of respiration and therefore the presence of people. Each Appliance is configured to transmit data obtained from its respective thermal and carbon dioxide sensors to a processing unit (being a physical or virtual device equipped with a memory, storage and a processor for computing and implementing executable code), for analysis to determine a first location corresponding to the presence or risk of fire and a second location corresponding to the presence of one or more people, wherein the processing unit has access to a stored memory comprising the layout of the building and/or a stored memory comprising the construction methods and materials of the building, together with reference data on the ignition and combustion time and temperature of the building materials, and the chemical products resulting from the combustion of the building materials.

In particularly preferred embodiments, the processing unit is a virtual machine in a cloud infrastructure providing almost instant and very high scalability in terms of computing resource and memory; preferred examples being Amazon Elastic Compute Cloud, or Microsoft Elastic Cloud on Azure.

The processing unit is further configured such that, by applying the said data from said Appliances to the said stored memory and, using algorithms and tools and techniques of machine learning, it constructs virtual (i.e., computer-generated) dynamic real-time models representing the current state of the nature and extent of the fire at the first location (a current-state model), and a probabilistic state of the fire hazard corresponding to its likely development and physical evolution over time in relation to the second location and a pre-determined range of possible firefighting interventions (a probabilistic model).

Furthermore, the processing unit has access to a stored memory of pre-determined policies in relation to the building which define actions to be taken in response to different fire hazard scenarios and references these policies against the said current-state and probabilistic fire models, so as to determine the appropriate policy-based response. The processing unit stores, communicates and represents data relating to the first and second locations and the said models of the fire hazard in accordance with the appropriate policy-based response.

This third aspect of the invention further comprises a communications device configured to receive data from the processing unit and for communicating data corresponding to the first and second locations and the current-state and probabilistic fire models, in addition to which is further comprised a wireless communications device configured to enable two-way real-time wireless voice communications with the Appliance, so that the persons at the second location can communicate in real-time with a remote system or persons.

One or more of the Appliances are arranged to detect elevated temperatures and carbon dioxide levels indicative of the presence or risk of fire. Typically, such Appliances are configured to be mounted either on ceilings or on walls, at varying heights, to account for the difference in density (relative to air) at normal pressures of respiratory carbon dioxide (once cooled after exhalation, denser than air at room temperature) and combustion carbon dioxide (less dense than air at room temperature). The Appliances may equally be able to detect the presence of a flame or rise in ambient temperature that is indicative of the presence or risk of fire, or an increase of carbon dioxide levels of a magnitude and height in the room indicative of the presence or risk of fire.

One or more of the Appliances are arranged to detect elevated temperatures indicative of body heat and ambient levels of carbon dioxide indicative of respiration and therefore the presence of one or more people. The thermal sensors of the Appliance are configured to identify (or be in communication with a processor that identifies) the increased levels of infrared radiation emitted by human beings (i.e., a temperature of ~37° C.) in comparison with their surroundings at normal room temperature. These detected levels of IR radiation may therefore be used to infer the presence of people within the building. Even if a fire has broken out, areas of the building where the fire has not yet spread will often still be cool relative to body heat, thereby allowing the effective detection of people and their locations within the building.

Furthermore, even if the ambient room temperature in which some persons are located is close to or even exceeding 37° C., due to the nearby presence of fire or for other reasons, which would make detection of the presence of such persons more difficult or less reliable solely by means of body heat, the carbon dioxide sensors would still enable the detection of the respiration of said persons; the accuracy of such measurements could be further refined by the application of machine learning to the historical data of combined body heat and carbon dioxide stored in a memory to which the processing unit has access.

It is an important aspect of this invention that the fire and occupant safety system collect data on carbon dioxide and body heat continuously during non-emergency situations, so that the processing unit, by applying tools and techniques of machine learning, can recognise changes in ambient levels of carbon dioxide and compare these levels to the number of detected body heat signals in a given room. This is necessary because, unlike body heat which is independent of the environment, carbon dioxide levels in a room can vary significantly due to the rate of airflow, ventilation of the room, presence of plants and moulds and factors other than respiration; it is therefore necessary for the machine learning aspects of the processing unit to be trained to identify a range of "normal" carbon dioxide readings for a given room, in multiple occupation scenarios in order to build a complete picture of a non-emergency "baseline" of carbon dioxide readings, against which to measure and interpret readings during a fire emergency.

The application of machine learning and the detection of respiratory carbon dioxide levels, as a means independent of body heat for the detection of the presence of people as described above, is particularly important in relation to the protection of unaccompanied children in the event of a fire; studies and numerous anecdotal reports from firefighters confirm that the typical response of an isolated child to the threat of a fire is to hide (most often under a bed or box, or in a cupboard), or to wrap themselves under a curtain or thick bedclothes; in such a case, it would be very difficult to detect the presence of a child by means of body heat alone, as the transmission of the child's body heat to the thermal sensors would be severely impaired by the insulating effect of the covering or location under or in which they are hiding; however, respiration and therefore carbon dioxide levels are much less affected in this way and would be more reliable as a detection method when compared against pre-existing baseline levels.

The Appliances arranged to detect elevated temperatures and carbon dioxide levels indicative of the presence or risk of a fire may be arranged separately to the Appliances arranged to detect elevated temperatures and carbon dioxide levels indicative of the presence of one or more people, due to the difference in relative densities between respiratory carbon dioxide and combustion carbon dioxide (respiratory carbon dioxide being denser than air once it has cooled to room temperature and therefore more likely to be detected closer to the floor, while combustion carbon dioxide is less dense than air, until cooled, and is more likely to be detected closer to the ceiling). In this way, the fire safety system of the invention may comprise one or more first Appliances arranged to detect elevated temperatures or carbon dioxide levels indicative of the presence or risk or a fire, and one or more second Appliances arranged to detect elevated temperatures and levels of carbon dioxide indicative of body heat and therefore the presence of one or more people.

For example, the first Appliances may be positioned in locations where the heat of a fire and the carbon dioxide due to combustion may be most easily and speedily detected (e.g., a ceiling mounted unit) or higher up on a wall such as at chest height (e.g., incorporated into a light switch), whereas the second Appliances may be positioned in locations where a wide view of the lower portions of a room may be best obtained for thermal sensing, and where the concentration of respiratory carbon dioxide is most likely to settle, (e.g. incorporated into a socket faceplate) in order to detect the presence of people hiding under a bed or in a cupboard, such as has already been stated in the case of isolated children. Most studies suggest that the optimum height range for a carbon dioxide sensor is typically between 0.75 m and 1.8 m from the floor and this suggests that the best way to incorporate the wall-mounted Appliances is within a light switch faceplate, to gain the optimum angle for heat and carbon dioxide detection.

Numerous fire research experiments suggest that the difference in temperature, during a compartment fire, between ground floor and eye-level can be of the order of up to 5 (five) times, it is therefore an aspect of this invention that the height of the thermal sensors, relative to the floor of the compartment, be measured and disclosed to the processing unit, so as to enable an accurate calculation of the room temperature at different temperatures to be made by wall-mounted Appliances.

In some embodiments, one or more (preferably each) of the Appliances is arranged to detect the presence of elevated temperatures and carbon dioxide levels indicative of the presence or risk of fire, and also arranged to detect elevated temperatures and carbon dioxide levels indicative of the presence of one or more people. For example, data obtained from an Appliance mounted on a ceiling unit or light switch unit may be indicative of either a fire or a person dependent on the detected temperature and height, rate of increase and density of carbon dioxide detected. In particular the system preferably comprises one or more ceiling-mounted and wall-mounted Appliances, each comprising a thermal and carbon dioxide sensor for detecting the presence of fire and the presence of people derived from a body heat signal and carbon dioxide levels. In particular the Appliances are configured to detect the presence of a body heat signal when there is no fire present, and wherein the representation of that data in terms of a visualisation, most typically on a remote device, is subject to privacy policies. The elevated position of the ceiling-mounted or light-switch sensor units and their wide field of view means that they are particularly well suited to identifying the presence of fire or body heat within a room below, subject to constraints already noted in the case of isolated children in the case of ceiling-mounted Appliances. The ceiling-mounted or light-switch mounted sensor units may additionally comprise one or more sensors, for example a smoke sensor.

The thermal sensors most appropriate for detecting and measuring the high temperature of an ongoing live fire (necessary for the probabilistic models) are, in general, different to those used for detecting the lower temperature of an early stage fire and/or the body heat and the presence of people; due to the prohibitive costs of the high temperature thermal sensors for ongoing monitoring of a live fire, it is most likely that they will be included only in certain of the ceiling-mounted units. The exact arrangements of said thermal sensors will be down to the specific layout of the building and the decisions of the Responsible Authority, in terms of budget. The foregoing allows for the possibility that an Appliance may therefore contain one or more types of thermal sensor, in addition to a carbon dioxide sensor and voice and data communication.

The thermal sensors in the Appliances may each comprise an infrared camera. Preferably, each thermal sensor is an infrared camera comprising an array of thermopile detector pixels. In this way, a highly accurate reading of the temperature of the environment surrounding the sensor may be obtained in order that a fire hazard and/or the presence of a building occupant may be determined. The use of thermal imaging allows for the distribution and change in thermal temperature to be measured, allowing for more information to be gathered so as to provide a more reliable identification of a fire hazard at an earlier stage.

Typically, the thermal sensors comprise a lens providing a field of view of greater than 30 degrees. This advantageously provides a wide field of view, allowing for reliable detection of a fire hazard and of the presence of one or more people within the building. Such a wide field of view advantageously allows monitoring of large areas such as rooms, corridors and stairwells. Preferably, the thermal sensors comprise a lens providing a field of view of between 30 and 90 degrees, preferably around 60 degrees.

Preferred thermal sensors that may be used in the fire and occupant safety system of the present invention for detection of fire are the Caylex PUA8-301 thermal sensor, whereas preferred thermal sensors for body heat detection include the Omron D6T-44L-06 or the Panasonic grid-EYE® sensor, generally used for movement detection, occupancy detection, people counting and lighting control. Preferred carbon dioxide sensors that may be used in the fire and occupant safety system are the TDK InvenSense™ TCE-11101 or the Infineon Xensiv™ Photacoustic sensor, integrated into a Printed Circuit Board.

The invention may further comprise receiving supplementary data from one or more of: a smoke sensor; a gas sensor; a carbon monoxide sensor; a toxic gas sensor which detects the typical gaseous by-products of cellulosic and hydrocarbon combustion (typically; hydrogen cyanide, hydrogen chloride, sulphur dioxide, nitrogen dioxide); an oxygen sensor; an airflow sensor; a smoke density sensor; a probe inserted into a wall to measure heat transmission through a wall, in order to assist in the estimation of temperature in a compartment on one side of the wall in question through the application of heat transfer algorithms; a Radio Frequency Identification (RFID) antenna and reader arranged within the building and any or all of which may, in some embodiments, be embedded in the same housings as the thermal and carbon dioxide sensors, and wherein the determination of the first location is further based on an analysis of the supplementary data. The use of such supplementary data obtained from additional sensors in addition to the data received from the thermal and carbon dioxide sensors allows the method to determine the first location (i.e., the location(s) of the fire) more reliably and, in the case of the RFID sensors particularly, enables the detection and visual representation in the models of firefighters wearing or carrying appropriate RFID tags, which is helpful to the command centres in the event of a fire as it identifies the physical distribution of their fire-fighting resources within the building, in real-time.

In some embodiments, the RFID tags may be wearable items issued to firefighters and in preferred embodiments, the RFID "tag" may be a downloaded app on a smartphone issued to and carried by firefighters.

In this third aspect of the invention, the capture of additional supplementary data, as described above, will significantly improve the accuracy of the current-state and probabilistic models of the fire hazard; Computational Fluid Dynamic ("CFD") and other Computational Physics algorithms (for example, plasma dynamics) are the best methods for simulating the likely development of an MRHR fire; these can be incorporated with various standard "fire curve"

algorithms, for example the Cellulosic Fire Curve (ISO 834, see FIG. 2), which is most likely to be relevant to a building fire and by further reference to data on the construction materials, methods and layout of the building, the most accurate current-state and probabilistic models of the fire can be determined and represented in the various ways previously described.

In preferred embodiments, the information on toxic gases such as carbon monoxide and hydrogen cyanide (both highly toxic and highly flammable) and nitrogen dioxide (which is highly toxic) helps the processing unit, through the application of heat transfer and CFD algorithms and data on the temperature of the compartment, to estimate the explosive and combustion potential of any gas clouds within the building and incorporate these into the probabilistic models. Such models are further enhanced by data captured on airflow (since this is required to estimate the direction of travel of the gases) and projected oxygen levels, which if used up by the fire and not replaced can indicate the probability of the fire smothering itself.

Such modelling is vitally important in the communal areas of the building, especially the stairwells; in an MRHR fire, the stairwell represents a column of oxygen which is available as fuel for combustion and, due to the "chimney effect" and the tendency of hot gases to rise, provides the most effective means of heat transmission to the internal higher parts of a building. Since the stairwells are also the best means of evacuating occupants and enabling the egress of firefighters, it is extremely important that further supplementary data be captured in these parts of the building for the most effective probabilistic models to be constructed.

With data capture of this type already in place in the processing unit, it is furthermore clearly possible to simulate the effectiveness and likely impact of firefighting interventions; this could be achieved either by configuring the processing unit to automatically evaluate a pre-determined list of possible interventions, or in response from a configured request from those in command of the overall firefighting effort at the scene, or in a control room, to propose various firefighting interventions (for example, the impact of positive pressure venting in a stairwell, which involves increasing the air pressure in a stairwell to force toxic gases to escape) such that said intervention plans may be uploaded in a pre-configured way to the processing unit for analysis and modelling, taking into account the known location of the occupants, in order to simulate the likely impact of the interventions in real-time and communicate the output of said intervention models back to those responsible for fighting the fire, in order for them to decide when and how to execute said interventions.

The application of Computational Fluid Dynamics (CFD) and other algorithms, such as the Cellulosic Fire Curve (ISO 834), to the data captured by the Appliances and ingested by the processing unit are essential components of all aspects of the method and invention; there are multiple commercial CFD software modelling programs already widely in use for fire safety design purposes in MRHR buildings, such as SOFIE, JASMINE, SMARTFIRE & CRISP and such code is easily adapted for the purposes of modelling established fires.

In order to take full advantage of the CFD codes and elastic computing capabilities of the processing unit in preferred embodiments, it is necessary to have detailed information on the building layout, the materials in all aspects of the construction, the construction method, the thickness of the compartment boundaries (walls, ceilings and floors) and pre-determined information such as the thermal conductivity and resistance of said materials, such that the processing unit has access to all these parameters and data for the construction of the virtual models.

It is an important aspect of the invention that a detailed structural survey of the building is undertaken prior to the deployment of the Appliances, so as to capture the information described above and to be able to render the information in a 3D digital representation of the layout of the building; such a representation has the benefit of ensuring that the Responsible Authority for the building also complies with the recommendations of the Grenfell Report.

It is also important to "train" the Artificial Intelligence (AI) in the preferred cloud-based embodiment of the processing unit in the simulation and interpretation of the results of fire modelling, especially for the probabilistic models; this is achieved by running multiple simulations of real and theoretical building layouts and different fire and occupancy scenarios and, in preferred embodiments of the invention, this is a constantly running process in the background.

In relation to the identification of the first location (i.e., the location of a fire), the method may comprise two methods of heat measurement, direct and indirect. In the case of direct heat data capture, the measurement of the heat source is made directly by the thermal sensors, typically when the sensors are exposed to a local heat source, such as a fire, in the same compartment.

In the case of indirect heat capture, the temperature inside a compartment can be inferred by sensors located outside the apartment; by reference to the heat flux (rate of heat transfer) from the outer wall of the compartment and the temperature of the outer wall, combined with known quantities such as the thickness of the wall and the thermal conductivity of the material in the wall, the temperature of the wall inside the compartment can be calculated. The temperature of the outer wall of the compartment can easily be measured by another Appliance located nearby, perhaps in an adjoining compartment or adjoining communal area and this data can be communicated to the processing unit.

Preferably, the communications device is configured to send and receive data to and from the processing unit, by means of which it is possible for commanders at the firefighting bridgehead, or others, to pose various firefighting interventions to the processing unit for simulation and evaluation; furthermore, preferably the communications device is configured to receive data from the processing unit that is indicative of a safe route through the building between the second location corresponding to the presence of one or more people and an exit of the building, avoiding the first location and the likely path of the fire according to the probabilistic models. Alternatively, or in addition, the communications device may comprise one or more audible indicators arranged within the building, configured to audibly indicate a direction corresponding to the safe route through the building.

Such audible indicators may be in the form of an alarm sounder, for example, or a speaker configured to play a pre-recorded announcement, or may be virtual assistants using Artificial Intelligence ("AI") technologies, such as Alexa®, Siri®, Cortana® or Google Assistant®.

Alternatively, or in addition to the audible indicators located within the building discussed above, the communications device may be configured to send a signal to one or more remote devices. A remote device is a device that is remote from (i.e., separate from) an Appliance, and typically may be any device that is not an Appliance. A remote device may alert a user to take action. Such remote device may be, for example, a smart phone, smart television, voice assistant device or other smart user device. A remote device may take action to address a potential hazard. Such a remote device may be, for example, a remotely controlled valve, a router or hub, a docking station for a mobile phone, a fire alarm, a smoke alarm, a sprinkler system.

Preferably, the fire safety system further comprises one or more remote devices, wherein the communications device is configured to communicate with the one or more remote devices and preferably this includes the ability for the communications device to upload proposed firefighting interventions from remote devices, to be simulated and evaluated in the processing unit and the results downloaded to the remote devices, via the communications device.

In embodiments, the one or more remote devices may be configured to shut down an appliance in response to data received from the communications device.

In embodiments, the one or more remote devices may comprise a user device, and the communications device is configured to send data corresponding to the first and second locations and the one or more fire models to be displayed on the user device. For example, a user device in the form of a smartphone may run software configured to operate with the fire and occupant safety system. The software may display alerts to a user, identify the location of the fire hazard, display a safe route to the exit of the building, provide instructions on what to do next, allow a user to choose an option to address the hazard such as shutting off a main or local supply or gas, water, electricity, activate a sprinkler system, call the emergency services or turn an appliance off. In preferred embodiments, the first and second locations are displayed on the user device in the form of a visualization of the building. This is particularly useful for members of the emergency services when planning the correct action to take to reduce the risk of the fire hazard and ensure the safety of the occupants of the building. The software may cooperate with an internal navigation module of the user device in order to direct evacuees out of the building, as described with reference to the first aspect of the invention.

Preferably, each of the Appliances is connected to a battery power source. Such a battery power back-up ensures that if the mains electricity fails or is switched off in response to the detected fire, the Appliances continue to operate for a certain amount of time. This allows the first and second locations to be continuously updated in response to the spread of the fire, and movement (e.g., evacuation) of people through the building.

The plurality of Appliances may be arranged within the building in an exposed manner. In other words, the Appliances may be mounted on a wall or ceiling (for example) with no or minimal housing or integration into existing devices or appliances. However, typically, the plurality of Appliances comprises one or more of: a mains socket faceplate; a light switch faceplate; a wall-mounted unit; a ceiling-mounted unit.

In the case where the Appliance is a mains socket faceplate, the respective thermal and carbon dioxide sensors may be located within the faceplate housing and frontally directed out of the housing so as to detect the temperature and carbon dioxide levels of the lower portions of a room.

Preferably the mains socket faceplate is configured to be mounted on a surface such as a wall to interface with the mains electrical wiring. In particular the Appliance is a mains socket fascia unit which may be installed in a building in the place of conventional mains socket units for example by screwing the device to the wall at the electrical access points. This allows for thermal and carbon dioxide sensors of the Appliance to be installed throughout a building to monitor all rooms.

The fire safety device may be a light switch faceplate or a wall- or ceiling-mounted unit. The positioning of one or more Appliances within or on such fire safety devices advantageously allows a wider view of a room or corridor to be achieved, in comparison with a mains socket for example, which is typically located near the floor of a room. Thus, thermal and carbon dioxide sensors located within a light switch faceplate or wall- or ceiling-mounted units are particularly advantageous for the detection of one or more people within the building Ceiling units are especially advantageous in communal areas of a building.

Communal areas represent an important aspect of the information captured by the invention, since a fire detected in such an area almost always means that the compartment in which the fire started has been compromised and the threat of a serious escalation of the fire is high, if spreads to communal areas; such a spread is known as a "fire breakout".

It is important that detectors in communal areas can report key data on the fire to the processing unit, especially regarding rapid temperature change, or flashover risk, inside an adjoining compartment.

Preferably, this is achieved by direct measurement of the temperature of the inside of the compartment by one or more Appliances located in the compartment, which requires the Appliance to operate at high ambient temperature. The temperature of a building fire can reach 1,000° C., and flashover (the simultaneous ignition of all contents within a room or enclosed space) can happen at 500-600° C., posing a particular threat to life for firefighters who attend the scene. It is especially important that the Appliances survive for as long as possible up to at least 500° C., a quality known as "thermal survivability".

In preferred embodiments, thermal survivability is achieved by coating the Appliances in a heat insulating substance. At least some of the Appliances would be coated in, or situated in housing coated in, heat resistant or heat insulating substances (such as ceramics, for example Zircotec® performance thermal barrier plasma applied ceramic coatings or ZircoFlex® foil insulation) which can allow the sensors to continue to operate up to approximately 500-600° C. This allows the particularly dangerous flashover risk to be monitored.

In circumstances where the compartment temperature exceeds the flashover temperature and causes the failure of the Appliances, the invention enables the identification of a potential fire breakout before it happens by inference of the temperature of the fire inside a compartment from the outside; this is necessary since a rapid escalation in temperature inside a compartment is an early warning of a potential breakout; this inference by indirect measurement is achieved by the invention by means of the monitoring of the heat radiation, over time, from the outer wall of a compartment by an Appliance which is situated in an adjoining compartment or communal area; combined with information on the temperature of the wall, the thickness and material used in the wall (obtained from the building survey) and further combined with pre-determined information on the thermal conductivity of the wall material per unit length or unit area, it is possible to calculate the temperature of the inside wall of the compartment.

Each Appliance is configured to transmit data obtained from its respective thermal and carbon dioxide sensors to a processing unit for analysis to determine a first location and a second location. The processor may be located locally within the building, or within the fire safety device itself, or as has already been stated, may be provided as a distributed system (e.g., "Cloud" system). In some examples, the fire and occupant safety system may comprise a local processing unit for processing the data received from the sensors and the system may further be configured to send data to a remote processing unit in the cloud, whereby the location in which processing takes place may be selected based on the particular task, the processing requirements, or the current network status. In other examples, each Appliance comprises an internal processing unit configured to process data collected by a sensor of the Appliance to determine hazard information. The system may further comprise one or more devices, preferably a ceiling mounted device, comprising an internet connection for sending hazard information from other Appliances to a remote processing unit for further processing.

The data may be transmitted from each Appliance either directly or indirectly; for example, each Appliance may comprise a SIM or Narrowband IoT connection for direct communication with the processing unit, over the internet. More typically, each Appliance may transmit its respective data to the processing unit indirectly. For example, an Appliance may be in communication with a node ("hub") within a local network, which may itself be another Appliance specially assigned for that purpose, where the hub may communicate the data to the processing unit over an external network, such as the internet.

Preferably, each of the Appliances comprises a communications link such that each Appliance is in communication with each other and, in some examples, forms a full mesh (i.e., non-hierarchical, peer-to-peer) network throughout the building. In this way, coordinated alerts and actions may be provided. For example, if one Appliance detects the presence of a fire hazard, this may be communicated to other Appliances within the communication network, whereby alarm sounders located on the other Appliances may sound, quickly alerting occupants to the danger; in some embodiments, the Appliances may alert other remote devices which are installed as part of a third-party fire detection or building evacuation system. Preferably, the Appliances are in communication with each other via one or more of a wireless communication link such as Wi-Fi, Bluetooth or narrow band radio frequency. Preferably, the Appliances are in communication with each other via two communications networks such that if one fails, data obtained from the thermal and carbon dioxide sensors may still be communicated between the Appliances. Typically, the Appliances form a meshed network. One or more of the nodes within the meshed network (e.g., a "hub") may be configured to send the data obtained from the Appliances to the processing unit for analysis and determination of the first and second locations.

The data that is transmitted from each of the Appliances to the processing unit may be in the form of "raw" data, (e.g., temperature and carbon dioxide concentration measurements), and the processing unit may analyse said data by comparing it to predetermined thresholds in order to identify the presence of a fire and/or building occupants and their locations. More typically, each Appliance may comprise a local processor for identifying the presence or risk of a fire and/or person based on the data from its respective sensors, and the data transmitted to the (central) processing unit is in the form of the identified presence of a fire and/or person in combination with the said "raw" data. From these data, the central processing unit may determine the first and second locations. A local processor within each Appliance may determine the presence or risk or fire and the presence of one or more people by comparing the temperature data obtained by the respective thermal and carbon dioxide sensors to predetermined thresholds, which in the case of carbon dioxide levels in particular may involve the application of machine learning by the processing unit, in order to establish "baseline" levels of carbon dioxide in typical internal airflow configurations of the building, which may have been communicated to the appliances in advance of a fire. In embodiments, if a fire has been detected, each Appliance may operate solely in "person" mode where the local processor only compares the received temperature and carbon dioxide data to a predetermined threshold indicative of the presence of one or more people. Alternatively, such analysis may be performed by the processing unit.

Preferably, the fire and occupant safety system is configured such that the processing unit receives data from the Appliances in real time. In this way, the determined first and second locations, a probabilistic model of the fire and, if required, probabilistic models regarding the likely impact of simulated firefighting interventions, may be updated with actual data from the fire in real time or near real time (e.g., within 1 or 2 seconds of the event), enabling the safest possible escape route out and rescue priorities to be determined.

The fire and occupant safety system may be additionally configured to automatically contact the emergency services upon determining the presence of a fire. The system may also send an alert to a user device to confirm that the emergency services have been contacted.

The fire and occupant safety system may further comprise one or more of: a smoke sensor; a smoke density sensor; an oxygen sensor; an airflow sensor; a gas sensor; a carbon monoxide sensor; a multi-gas sensor for detecting multiple gaseous products of combustion; and RFID antenna and readers. The use of such additional sensors and readers, in addition to the thermal and carbon dioxide sensors, allows the system to sense the presence of a greater range of hazards and identify hazards more reliably; this is of particular value in constructing the probabilistic models referred to and is in particular applicable to the probabilistic models for communal areas, especially stairwells. Using a combination of sensors allows for a more detailed real-time model of the behaviour, spread, ignition and combustion of a wide variety of toxic and flammable gases and their likely impingement on the second location and/or escape routes, especially in the case of stairwells which, in a high-rise fire, give rise to the "chimney effect" and at the same time are usually the most effective means of evacuating the occupants (in the absence of external fire escapes). Furthermore, the extra data provided by the one or more additional sensors may be used by the emergency services to coordinate their efforts. For example, if the data from a sensor indicates the presence or threat of toxic or flammable smoke in or near a location where people have been detected, the rescue operation may prioritise that location. Such further sensors are typically located on or integrated within the plurality of Appliances; for cost reasons, it is likely that in a typical embodiment Appliances with the full range of said further sensors will be largely limited to Appliances arranged in communal areas of the building.

The fire and occupant safety system may further comprise a processing unit configured to: receive the data from the thermal and carbon dioxide sensors of the respective Appliances; analyse said data to determine a first location corresponding to the presence or risk of fire and a second location corresponding to the presence of one or more people; and communicate said data corresponding to the first and second locations to the communications device. Preferably, the processing unit is configured to construct current-state and probabilistic models of the fire and further to determine a safe route through the building between the second location corresponding to the presence of one or more people and an exit of the building, avoiding the first location and the path of the fire as predicted by the probabilistic models; in addition, the processing unit may communicate this information to remote devices and third-party systems such as evacuation management systems, which may include optical programmable "smart" signs designed to dynamically change in response to data received regarding the spread of the fire and the safest route out of the building. Typically, the processing unit is adapted to perform any of the features of the method of the first aspect of the invention.

Each Appliance may comprise an illumination device, for example a high-power LED light, configured to illuminate in the case of loss of power. In particular, if a hazard is detected in a dark room, the Appliances may be instructed to illuminate their respective illumination devices.

Further disclosed herein is a fire and occupant safety system comprising: a plurality of Appliances, each comprising thermal and carbon dioxide sensors and capable of two-way wireless voice and data communications, configured to be arranged within a building and configured to detect locations of elevated temperature and ambient carbon dioxide levels within the building; wherein one or more of said Appliances are arranged to detect elevated temperatures and carbon dioxide levels indicative of the presence or risk of fire, and one or more of said thermal sensors are arranged to detect elevated temperatures indicative of body heat and carbon dioxide levels indicative of respiration and therefore the presence of one or more people; a processing unit configured to receive data from the Appliances and determine a first location corresponding to the presence or risk of fire and a second location corresponding to the presence of one or more people and further configured to construct virtual (i.e., computer-generated) dynamic real-time models of the current state of the fire and probabilistic models of the likely development of the fire, in addition to models simulating the likely impact of proposed or pre-determined firefighting interventions; and a communications device for communicating data corresponding to the first and second locations and furthermore the ability for persons to communicate verbally and in real-time, using the Appliances, with a remote system or persons in order to identify medical conditions of one or more persons at the second location and to inform evacuation and rescue priorities. Such a fire and occupant safety system may include any of the preferred features discussed above in relation to the first, second and third aspects of the invention.

BRIEF DESCRIPTION OF THE DRAWINGS

Embodiments of the invention will now be described, by way of example only, with reference to the accompanying drawings, in which:

FIG. 1 is an extract from the UK Home Office fire statistics showing the number and type of fire by spread, in Medium-Rise & High-Rise (MRHR) dwellings;

FIGS. 10A and 10B are a flow diagram setting out the main steps of a preferred embodiment of the method of the invention.

DETAILED DESCRIPTION

Figure 3A:
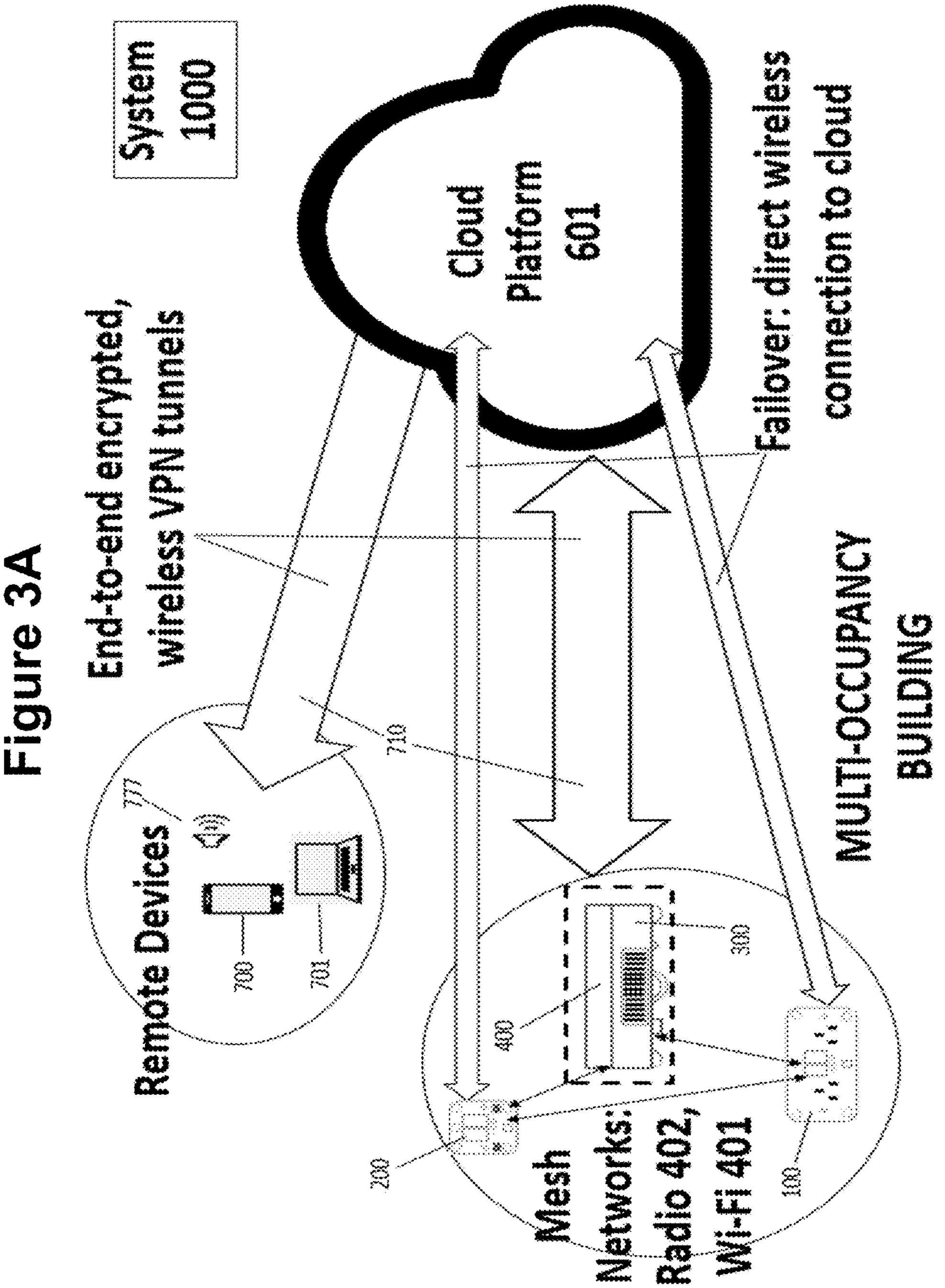
FIGS. 3A and 3B illustrate exemplary fire and occupant safety system according to embodiments of the invention in (1) a multi-occupancy building and (2) a single occupancy building.
Figure 3B:
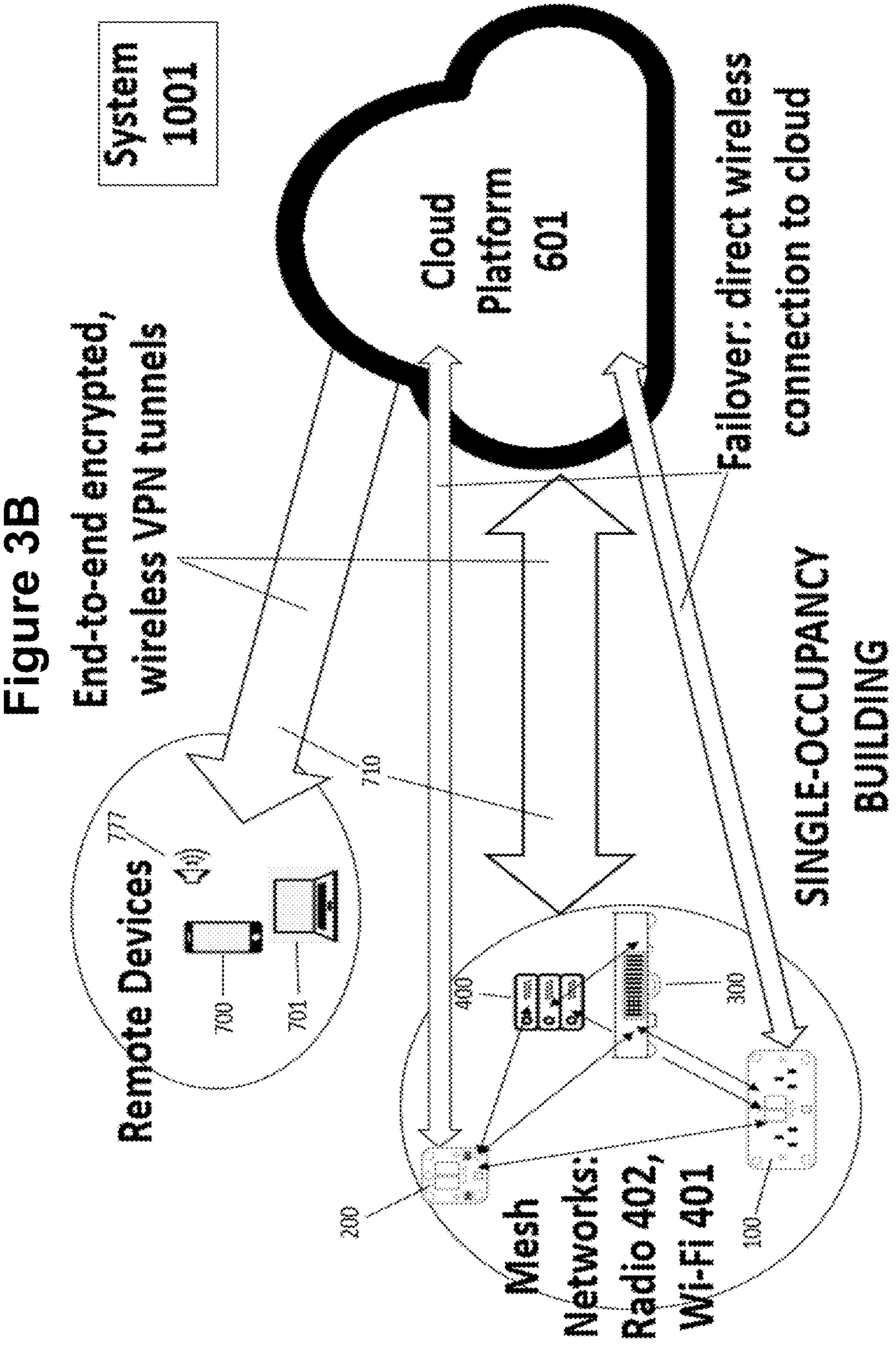

FIGS. 3A and 3B illustrate exemplary fire safety systems 1000 (multi-occupancy building) and 1001 (single occupancy building) according to embodiments of the present invention; the term "occupancy" here meaning not the number of people, but the number of different IT networks within the building; for example, hotels, university campuses, hospitals, single organisation office blocks are all examples of single occupancy because in each case there will be a single IT network for the building, whereas residential blocks and multi-organisational office blocks are examples of multi-occupancy, because each different resident is likely to have their own independent network and connection to the internet. Notwithstanding the foregoing distinction between single and multi-occupancy buildings, with the exception of the location of the hub 400 and the method of communication between hub 400 and cloud 600 (being wireless only in the case of a multi-occupancy building and wired or wireless in the case of a single occupancy building), the systems 1000 and 1001 are otherwise identical in all respects and, unless otherwise specified, a reference to one is a reference to either.

The fire and occupant safety system includes a plurality of Appliances arranged throughout a building, each Appliance equipped with one or more thermal sensors 110, 120, a carbon dioxide sensor 130 and a means of wireless voice and data communications. In the present embodiment, the Appliances are integrated within a plurality of corresponding fire and occupant safety devices 100, 200, 300. The Appliances may take the form of one or more mains socket faceplates 100 arranged within the building; one or more light switch faceplates 200 and one or more wall- or ceiling-mounted units 300. A fire and occupant safety system according to the invention may comprise one or more types of Appliance; for example, some Appliances may be fitted with both thermal sensors 110 and 120, some may be fitted with thermal sensors 110 only, or 120 only.

The fire safety devices 100, 200, 300, may each comprise a communications link so as to be able to communicate with each other via wireless connectivity, for example radio narrow band frequency, Wi-Fi and Bluetooth. Preferably the safety devices are each configured to communicate over two communication channels such that all of the safety devices can operate on two different types of network, as a failsafe. In this example, the safety devices can communicate via Wi-Fi 401 and a radio mesh network 402, for example 868 MHz. By providing two communications networks, if one network goes down, data obtained from the Appliances arranged throughout the building may still be communicated in order that the location of a fire hazard and the locations of the occupants of the building may be determined. In FIGS. 3A and 3B, lines connecting safety devices 100, 200, 300, and a smart hub 400 represent a radio mesh network 402 and a Wi-Fi mesh network 401.

The connectivity of each of the safety devices in the local network may be managed by a smart hub 400 which is connected to a central router (not shown) within the building. If the building is multi-occupancy, the smart hub 400 itself may, preferably, be an Appliance and comprise one or more thermal sensors and carbon dioxide sensors. In preferred embodiments in the case of a multi-occupancy building, the smart hub is integrated within one of the fire safety devices 100, 200, 300. Typically, the smart hub 400 is integrated within a ceiling-mounted unit 300. In cases where the building is single occupancy, it is likely and preferable that the hub 400 will be one or more separate devices inside the building. Although not shown in FIGS. 3A and 3B, the fire and occupant safety devices 100, 200, 300 will be configured to link to the nearest hub 400 in their vicinity, but since there will be a plurality of devices 100, 200, 300 and hubs 400 arranged throughout the building, in the event of any device 100, 200 or 300 losing connectivity to their nearest hub 400, said devices will automatically "roam" and link to the next nearest hub 400, in order to maintain connectivity to the cloud platform 601. As will be described in more detail later, in the event that all the hubs 400 are unavailable for any device 100, 200, 300, then said devices will communicate directly with the cloud platform 601 by means of an independent wireless communications capability which all devices will be configured with, and this "failover" independent link is illustrated in FIGS. 3A and 3B.

As the network of safety devices are in local communication with each other, alarms or other safety notifications may be initiated quickly in response to a detected hazard. For example, if a thermal or carbon dioxide sensor located within a mains socket faceplate 100 detects a local increase in temperature or carbon dioxide levels that is indicative of the presence of a fire, this information may be communicated to the other safety devices within the building over the local WiFi and radio mesh networks 401, 402. In response, the safety devices 200, 300 may initiate an integrated alarm sounder to warn occupants of the fire hazard, if this is in accordance with the alert and evacuation policy of the Responsible Authority.

The data obtained by the thermal sensors arranged throughout the building is processed by a system processing unit 500, which in this example is hosted remotely in a Cloud system 600, which is part of an overall cloud-based platform 601. However, in other embodiments the processing unit 500 may be located locally within the building. The data from the thermal sensors may be sent to the processing unit 500 from the smart hub 400 over the internet via the router. In other words, the data from each Appliance within the local network is transmitted to the smart hub which then communicates with the processing unit. The processing unit 500 is configured to analyse the data obtained from the thermal and carbon dioxide sensors of the fire and occupant safety system and determine a location of a fire or potential fire hazard, as well as the location of one or more people within the building. For example, if the data from a thermal or carbon dioxide sensor in a light switch faceplate 200 located within a living room of a flat on the first floor of a building shows a local increase in temperature or carbon dioxide levels indicative of the presence or risk of a fire, it can be inferred that the location of the fire is within the living room of that flat. Data from other Appliances located within the flat may also be analysed in order to confirm such a conclusion.

Data from the plurality of Appliances may also be analysed by the processing unit 500 in order to infer the location of one or more occupants of the building. For example, data from a thermal or carbon dioxide sensor located within a light switch faceplate 200 may indicate the presence of a child hiding under a bed in a second floor flat. Similarly, data from a thermal or carbon dioxide sensor integrated within a ceiling unit 300 in a corridor of the building may indicate that a number of occupants are evacuating the building in response to the alarms sounded by the safety devices following communication of a fire risk.

In the event of a fire being detected, the processing unit 500 will incorporate data from the various devices 100, 200, 300 and 400 arranged throughout the building and will reference a computer memory comprising; the building layout; the construction method; the construction materials; reference information such as the specific heat capacity, thermal resistance and thermal conductivity of said materials; the application of one or more fire curve algorithms, such as the Cellulosic Fire Curve (ISO 834). The data described in the foregoing will be ingested into one or more virtual computer processors, which shall grow in number as required by the size and complexity required by the situation; said data will be fed into appropriate CFD software 503, run on said virtual computer processors in order to model the current-state model of the fire and to simulate the likely development of the fire in a probabilistic model, which shall in particular reference the path and intensity of the fire in relation to the known location and medical condition of the occupants and the likely evacuation routes. This information will then be communicated from the processing unit 500 via a communications device 510, which may be a virtual device such as a cloud server using a communications link such as the internet, to one or more remote devices (which may be physical or virtual).

In FIGS. 3A and 3B, the local mesh network 402 is shown as having single connections between different nodes; this is for ease of illustration only. Typically, such networks will communicate by two different means, usually Wi-Fi and a radio network on an 866 Mhz or 868 Mhz frequency, for instance, such that if one network fails then communications between devices can continue on the other. Both communications networks 401 and 402, described in the foregoing, are included in the mesh network and although not separated out in FIGS. 3A and 3B, nonetheless they are understood to be different, redundant networks in the same mesh network.

With a constant simulation of the fire running in the processing unit 500, continuously updated in real-time with actual data from the fire, using machine learning algorithms the processing unit 500 can also simulate possible firefighting interventions for effectiveness and likely result and feed that information, through the communications device 510, to one or more remote devices to aid decision-making by those responsible for fighting the fire.

The present invention may allow the location of a fire and occupants to be detected with "room level" resolution.

The data processed by the processing unit 500 may be communicated to one or more remote devices 700 via a communications device 510. A particular remote device may be a smartphone 700 or laptop 701. The smartphone (or other smart user device) may run an app with which the user can receive alerts and notifications from the processing unit 500, via a communications device 510, which are indicative of the location of the fire hazard, a safe route out of the building, and instructions regarding what to do next. This information may be displayed on the remote device, for example a smartphone 700, configured to receive data from the device 510, which is displayed to the user on the smartphone screen.

The processing unit 500 may receive location information from a smartphone 700, for example in order to guide a user out of the building. In some examples the processing unit may also control aspects of the smartphone for example to switch on the "torch" function of the smartphone if it is detected that the mains power in the building is out.

In the event of a loss of connectivity between the communications hub and the cloud (600), the fire and occupant safety devices can (through Wi-Fi or Bluetooth or other "localised" communication means, link to any smart device on which the "app" is installed, in order to provide the same functions as if the loss of connectivity to the cloud had not occurred. In this scenario, the smart device would (temporarily at least) form part of the mesh network.

Figure 7:
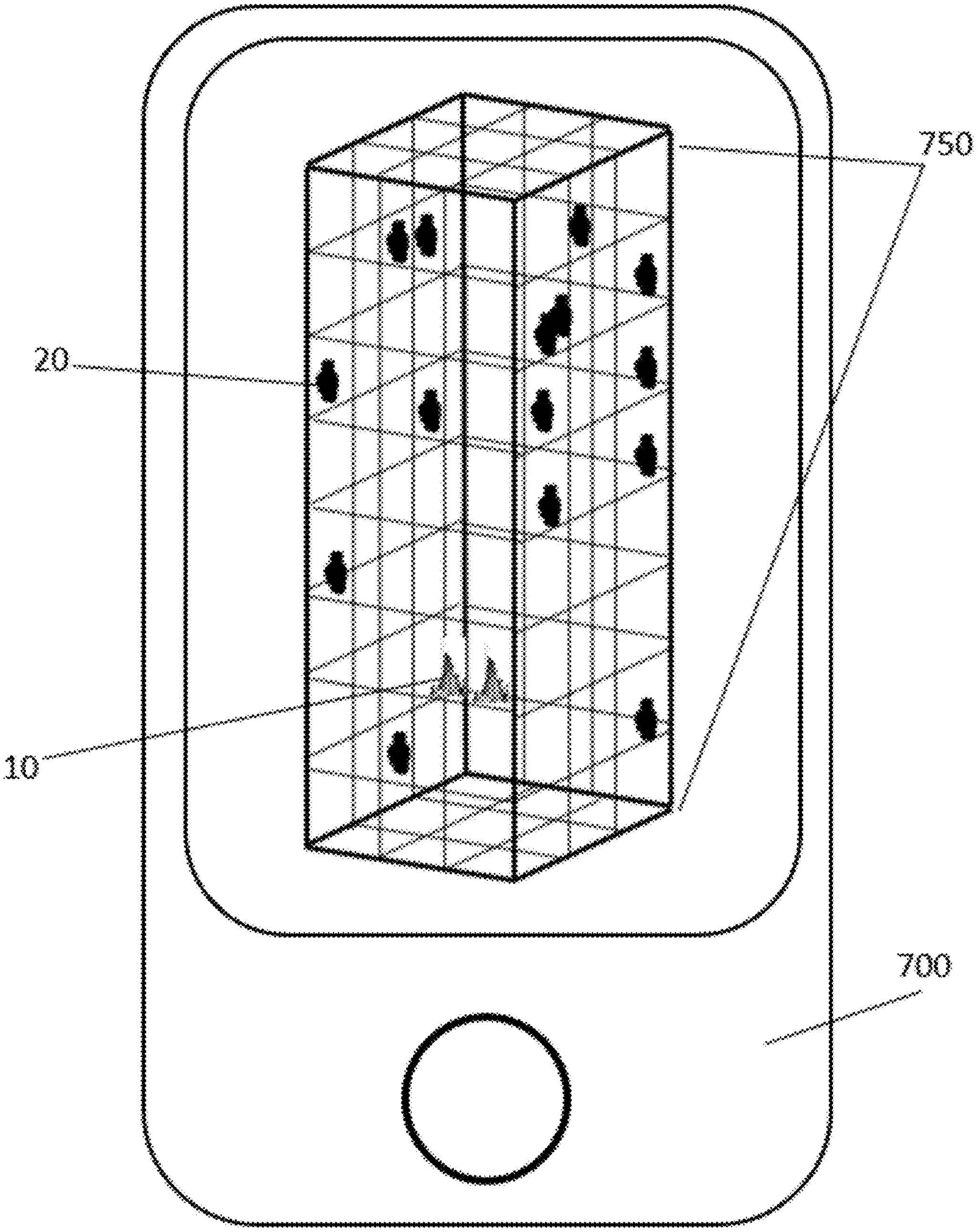
FIG. 7 illustrates a visual depiction of the location of a fire and the location of occupants of the building that have been determined based on data received by the fire and occupant safety devices 100, 200, 300.

As has been described, the fire and occupant safety system of the present invention uses a plurality of thermal and carbon dioxide sensors in order to determine the location(s) of a fire hazard and the location(s) of one or more people within a building. Particularly advantageously, authorised users such as building managers, fire and emergency services may be able to access this information, for example by secure access to the Cloud servers so that they can see the status of the fire, the distribution of the occupants and the output of the probabilistic fire modelling in real time or near-real time from their own devices. By using this information, the emergency services may focus their efforts to the particular locations of need and furthermore may choose to communicate with certain persons at certain locations by using the wireless voice communication capability within the Appliances, ensuring both the increased safety of the occupants of the building as well as the increased safety of the emergency service personnel themselves. Preferably, the locations of the fire hazard and occupants of the building may be displayed in the form of a three-dimensional visualisation 750 of the building (e.g., using data comprising a layout of the building stored in memory), as schematically shown in FIG. 7. As shown in FIG. 7, the location of the fire hazard (10) and the locations of a plurality of occupants (20) are clearly visualised throughout the building. Additional information could be included in the visualisation 750 relating to the fire; by way of example only, the location of the fire (in the example in FIG. 7, two flats are on fire); the temperature (in Kelvin); the fire threat level (out of a maximum score of 10.0) and key risk data such as time to flashover and the detection of highly dangerous toxic gases in a given location. In reality, there will be many variables capable of display than are illustrated in FIG. 7.

The building layout, construction method and materials data can be accessed for purposes of evacuation by the evacuees, if such disclosure is authorised by the Responsible Authority and, for purposes of emergency response, can be accessed by the emergency services. This data is typically stored in the cloud and accessed using appropriate user authority and identity management.

The fire and occupant location information may be accessed by active firefighters inside the building, during the fire. In this scenario, the system acts as an enhanced "spotter" to give the fire incident command, and the firefighters on the scene, the best possible picture of events with the lowest risk to themselves.

Optional RFID tags, either physical or virtual (embedded in a smartphone app), carried by firefighters can also be tracked by optional RFID sensors embedded in one or more Appliances, so that fire incident command can track the location of firefighters in addition to the location of occupants.

Typically, a remote device such as a smart phone or other smart device 700 may run one or two forms of software, or "app": (1) a user app (intended for residents), showing messages and evacuation routes and (2) a responders' app, (intended for emergency services and building authorities) showing the status of the fire as a whole and the evacuees throughout the building.

The software may also utilise a smart device's inbuilt navigation/tracking system (e.g., integrated GNSS and inertial sensors) to determine metrics of a building occupant's motion (e.g., position/direction of motion) in relation to the determined safe route out of the building, in order to assist the user in a safe evacuation.

The fire and occupant safety system may comprise a communications device in the form of one or more speakers 777, which in preferred embodiments may also be in the form of device configured to interact with a voice assistant such as Alexa™ or Siri™. The speakers may be configured to sound an announcement describing a safe route out of the building, which may be changed in real-time as the fire develops, avoiding the detected location of the first hazard.

The speakers 777 each comprise a wireless communications link for receiving a signal transmitted from the processing unit 500, whereby the speakers 777 may be actuated.

In order to determine a safe route out to the exit of the building avoiding the location of the fire hazard, the processing unit 500 may have access to a memory 501 storing data comprising the layout, construction methods and materials of the building. In response to receiving data from the thermal sensors and determining a location of the fire hazard, and the locations of the occupants of the building, the processing unit may access the building layout data and combine the determined locations with the building layout data, this will enable the construction of probabilistic fire models which will simulate the likely path and intensity of the fire and the gases liberated by it. A safe path through the building may then be determined. This evacuation route is subsequently communicated to the audible indicators over a communications link such as the internet 710 in order to communicate the evacuation route to the building occupants.

In other embodiments, a local processor, typically located on the smart hub 400, may communicate with the speakers or voice assistant 777 (e.g., over a local network).

The fire safety devices 100, 200, 300 are connected to the hub 400 via a local Wi-Fi or radio mesh network using frequencies as approved by BS5839, EN54 and or their derivatives. Data obtained from the thermal or carbon dioxide sensors located within or on the fire safety devices are transmitted via the local network to the hub 400, from where they are transmitted to the processing unit 500 for analysis. Typically, the local network may comprise two or more hubs (or fire safety devices comprising a hub) that are capable of communicating with the processing unit 500. In the event that any hub 400 loses connectivity to the processing unit 500 (e.g., because a fire in the locality of the hub exceeds the operating temperature of the hub), the data from the thermal sensors will be transmitted to the processing unit via a second hub which is still operational.

In some embodiments, each Appliance 100, 200, 300 may comprise communication means configured to communicate directly with the processing unit 500. For example, each Appliance may comprise a SIM card, preferably an NBIOT card (Narrowband Internet of Things) allowing it to connect to the internet.

Appliances

As has been explained above, the thermal and carbon dioxide sensors of the fire and occupant safety system according to the invention are arranged in an Appliance to detect elevated temperatures or ambient carbon dioxide levels that are indicative of the presence or risk of fire, or indicative of body heat or respiration and therefore the presence of one or more people and further comprising a voice and data communication capability in order for one or more people to communicate directly with a remote device or person.

Additional thermal sensors may be necessary to detect the presence or risk of fire once it has started and is producing significant quantities of heat, as opposed to detecting the presence of one or more people; in the case of a thermal sensor 110, 210, 310 to monitor the ongoing heat of a live fire, the detector is an array of pixels sensitive to infra-red radiation, most likely in the Long Wavelength Infra-Red (LWIR) spectrum (8 to 14 micrometre range) arranged behind a suitable lens; in the case of a thermal sensor 120, 220, 320 to detect the presence of one or more people or the early stages of a fire, each such thermal sensor is provided by an infrared sensor, in particular an infrared camera comprising an array of infrared detector pixels. The infrared array sensor may comprise an 8×8 grid array of thermopile elements that detect absolute temperature by measuring the emitted infrared radiation.

As has been previously stated, the thermal sensors most appropriate for detecting and measuring the high temperature of an ongoing live fire (necessary for the probabilistic models) are, in general, different to those used for detecting the lower temperature of an early stage fire and/or the body heat and the presence of people; the former generally operating at temperatures of −40° C. to 1,000° C. and being significantly more expensive than the latter, which operate from −20° C. to 80° C.; due to the prohibitive costs of the high-temperature thermal sensors for ongoing monitoring of a live fire, it is most likely that they will be included only in certain of the ceiling-mounted units, of which there is likely to be only one such Appliance per residence and wherein the majority of Appliances containing such sensors will most often be arranged in communal areas where the presence of highly elevated temperature levels indicates the presence or risk of a fire breakout. The exact arrangements of said thermal sensors will be down to the specific layout of the building and the decisions of the Responsible Authority, in terms of budget. The foregoing allows for the possibility that an Appliance may therefore contain one or more types of thermal sensor, in addition to a carbon dioxide sensor and voice and data communication.

Both types of infrared array sensors are able to provide thermal images by measuring actual temperature and temperature gradients, allowing highly precise measurements of surface temperature and identification of changes in temperature. Such a large viewing angle is also useful for monitoring large spaces such as rooms, corridors and stairwells within a building. The lens may comprise an integral silicon lens which provides a viewing angle of around 60 degrees.

The thermal sensor 110 for monitoring an ongoing live fire is preferably configured to detect temperature changes over a range of −40° C. to 1,000° C.; the thermal sensor 120 for detecting the early stages of a fire and for detecting body heat is preferably configured to detect temperature changes over a range of −20° C. to 80° C. The thermal sensor 110, 210, 310 may be for example a Caylex PUA8-301; the thermal sensor 120, 220, 320 may be for example an Omron D6T-44L-06 or Panasonic grid-EYE® sensor, generally used for movement detection, occupancy detection, people counting and lighting control.

An infrared array sensor also provides for the possibility of more complex processing carried out on the thermal image received by the sensor. For example, more advanced machine learning based algorithms can be used to detect, from outside a compartment containing a fire, temperature change patterns relating to the inside of the compartment which are indicative of a high-risk event such as Rollover (combustion of toxic gases near the top of a compartment and a prelude to the highly dangerous Flashover) or Flashover (the simultaneous combustion of all contents of a compartment).

There are several ways of detecting carbon dioxide and other gases in an air sample, the main methods being Non-Dispersive Infra-Red detection (NDIR), Photoacoustic detection and Metal Oxide Semiconductor detection (MOS).

An advantage of NDIR and Photoacoustic systems is that they can be used to detect the presence of many different gas molecules in a given air sample, which is of particular value in terms of providing supplementary data on other toxic gases typically produced by combustion and have a long operating lifespan (10 years plus), whereas MOS detectors have a lower lifespan (5 years) but are much lower cost.

Preferred carbon dioxide sensors 130, 230, 330, that may be used in the fire and occupant safety system are the TDK InvenSense™ TCE-11101 or the Infineon Xensiv™ Photacoustic sensor, integrated into a Printed Circuit Board.

Artificial Intelligence & Machine Learning:

The application of Artificial Intelligence (AI) and/or Machine Learning (ML) to the development of the probabilistic models and the simulation of firefighting inventions, using real-time information from the fire, is a key aspect of the method and invention.

Such tools are deployed within the processing unit 500, along with access to memory comprising the building layout, construction materials and methods, thermal data on said materials and pre-determined evacuation and privacy policies specified by the Responsible Authorities for the building and Computational Fluid Dynamics software for fire, plasma and thermal gas simulations.

Due to the computational complexity and intensity of the above tasks and the need, in an emergency, to rapidly scale the computational power of the processing unit to whatever scale is required by the nature of the emergency, in preferred embodiments the processing unit 500 would be configured as one or more virtual devices in the Cloud 600, forming part of a cloud-based platform 601.

For cost and scalability reasons, preferred cloud platforms would be so-called "public" or "hyperscale" cloud platforms such as Amazon Elastic Cloud®, Microsoft Azure® or Google Cloud Platform®, as opposed to "private" cloud systems wherein the physical computing hardware om which the cloud resides is dedicated to the processing unit and situated in a dedicated datacentre with fully redundant communications; although the "private" cloud approach is perfectly viable for performance reasons, it is not cost-effective compared to "public" cloud and especially in the context of multiple deployments of the invention.

The different characteristics of ML and AI mean they are likely to be deployed in different, though related, aspects of the invention; for instance, ML (being a subset of the broader concept of AI) in the context of the invention means the ability for a computer to learn and gain insight from data and analytics without needing to be explicitly programmed for this purpose; whereas AI means the simulation of human-type decision making from a broader perspective and wherein some of the components of said decision-making are derived from ML tools.

The AI and ML tools 599 and 598 can be deployed either as standalone capabilities requiring code development, coded specifically for use within the processing unit 500 (an example being the Amazon Sagemaker® suite of programs and capabilities) or could be pre-configured Artificial Intelligence "agents" already developed by the public cloud providers for deployment at scale (an example being the Amazon® AI Services suite within the Amazon Elastic Cloud® services). In preferable embodiments, it is likely that both approaches will be utilised.

Examples of aspects of the invention which would respond well to treatment by ML tools 598 include "baseline" setting of normal carbon dioxide levels within various private and communal areas of the building, important to establish in order to have a comparison against which to set levels indicative of the presence of human occupants during an emergency (this is because, unlike body heat, carbon dioxide is present in the atmosphere, even when humans are not; for instance due to the presence of pets, mould or other fungi and the usual displacement of air due to normal atmospheric diffusion and gaseous movement).

Another example of an ML application 598 is the inference of the inside temperature of a compartment from detectors external to that compartment; this is necessary since a rapid escalation in temperature inside a compartment is an early warning of a potential breakout; this inference by indirect measurement is achieved by the invention by means of the monitoring of the heat radiation, over time, from the outer wall of a compartment by an Appliance which is situated in an adjoining compartment or communal area; combined with information on the temperature of the wall, the thickness and material used in the wall (obtained from the building survey) and further combined with pre-determined information on the thermal conductivity of the wall material per unit length or unit area, it is possible to calculate the temperature of the inside wall of the compartment.

Figure 9:
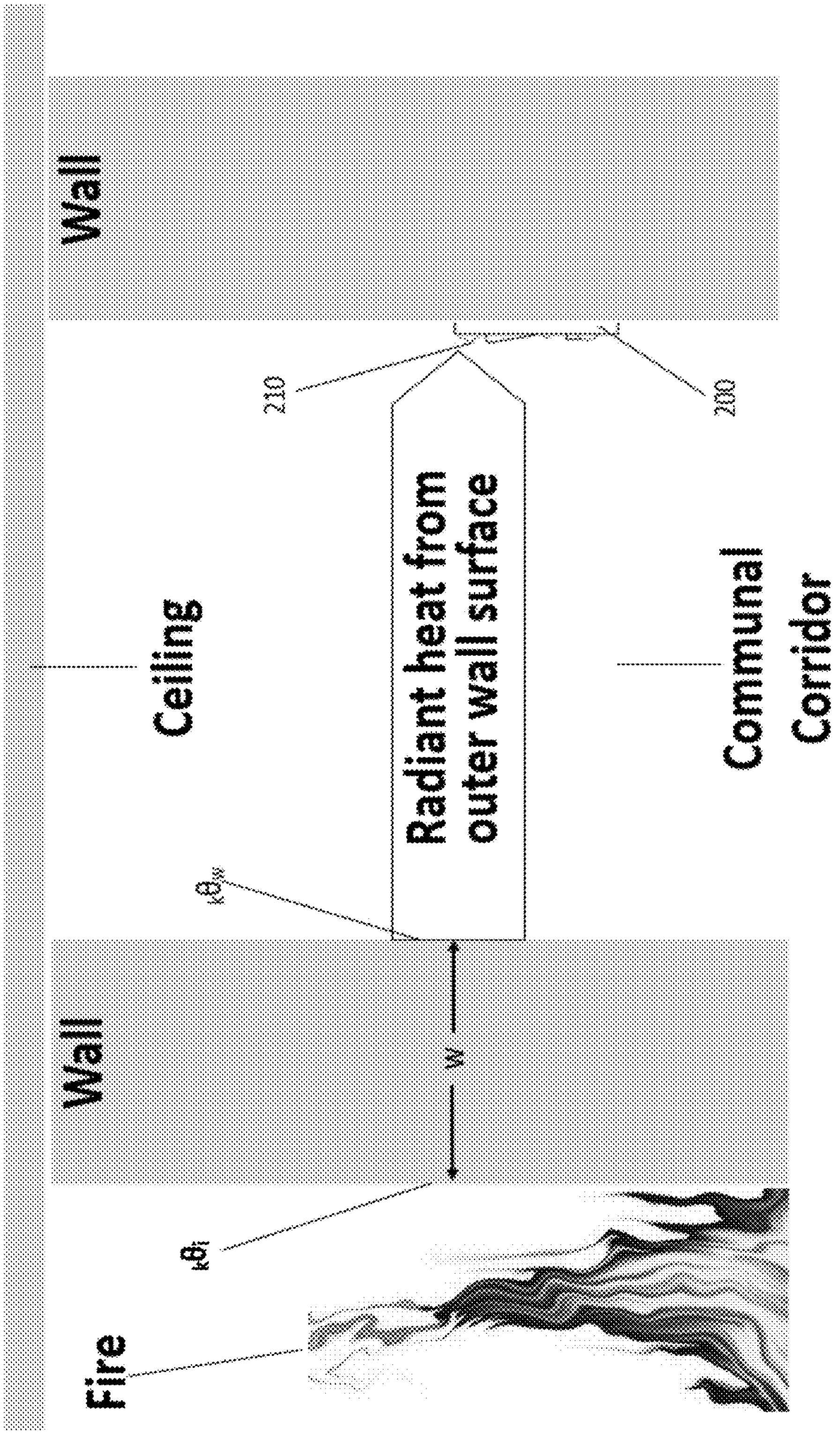
FIG. 9 illustrates an example of how the temperature inside a compartment can be inferred by Appliances placed outside the compartment.

FIG. 9 illustrates one possible method to accurately estimate the temperature of the internal wall of a compartment, in which a fire exists, from measurements of the temperature of a given area of the outer wall of said compartment; by estimating the temperature of the inner surface of the wall, we can then estimate the temperature of the air in the room itself using boundary equations. The method illustrated in FIG. 9 is now briefly explained.

FIG. 9 shows an example whereby the outer surface of two walls face each other, across a corridor, and the wall on the right has, affixed to it, a light switch faceplate device 200 fitted with a thermal sensor 210 (other configurations of device are possible). The compartment behind the wall on the right has no fire within it, whereas the compartment behind the wall on the left does, we seek to estimate the temperature within the compartment to the left by means of inferring the temperature of the inner surface of the wall of that compartment, denoted ${}_{t0}\theta_i$.

Figure 2:
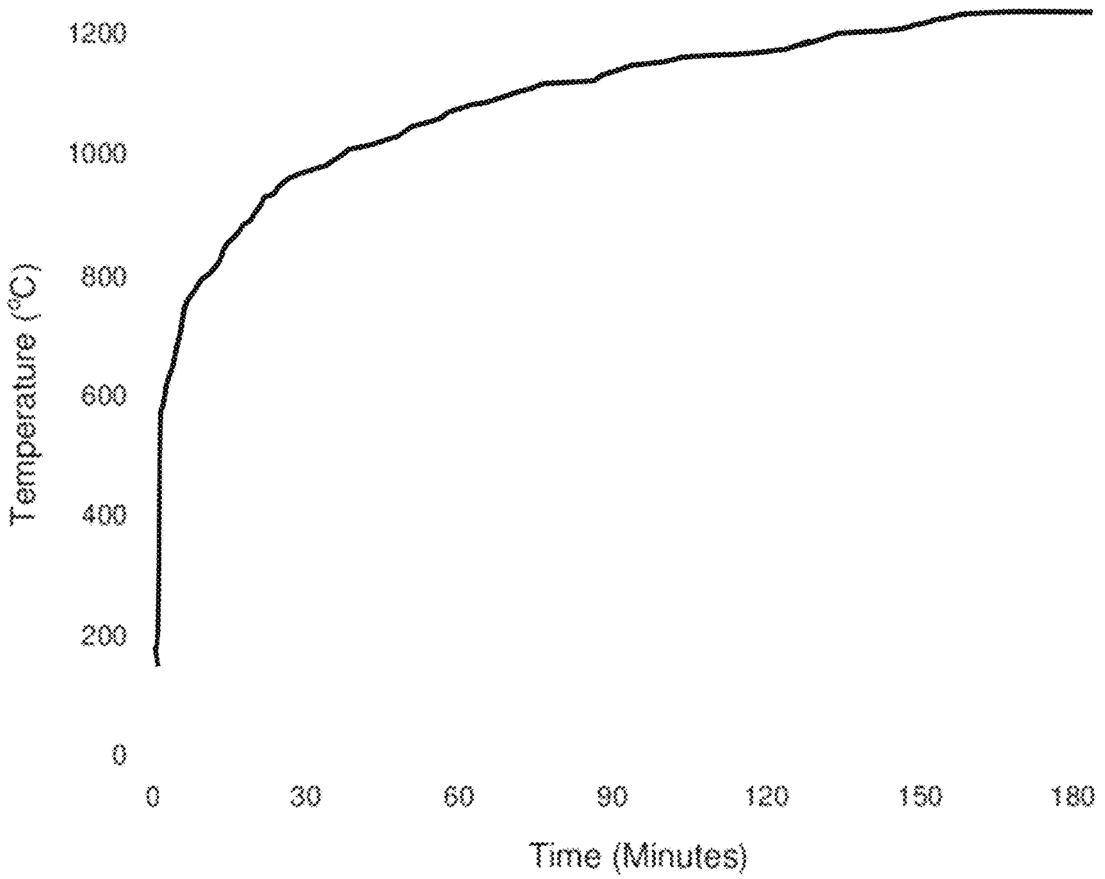
FIG. 2 is a graph illustrating an example of the cellulosic fire curve ISO 834.

The heating of an inner surface of a wall is an example of unsteady (or transient) state heat conduction, because the temperature of the fire which causes the thermal excitation of the inner surface is itself in a state of constant change (see the Cellulosic Fire Curve in FIG. 2).

We start with the fundamental equation of transient state heat conduction in a homogenous wall slab, of arbitrary thickness x:

$$q = -\lambda \frac{\partial \theta}{\partial x}$$

where:

q=rate of heat flow through a [homogenous] section of flat wall

θ=the temperature of the wall at a given point x=distance inside the wall from the interior surface, such that x=0 on the inner surface of the wall and x=w on the outer surface

By making appropriate algebraic transformations and using the Finite Differences method for solving a differential equation, we can derive the following relationship between (1) the temperature ${}_{t0}\theta_i$, of a point on the inner surface of the wall at time $t_0$ (which is what we seek to infer) and (2) the temperature of a point in the outer surface of the wall at time $t_0$ and at a later time $t_1$, which is what we can measure from outside the compartment:

$${}_{t0}\theta_i = {}_{t1}\theta_w\left(\frac{1}{p} - 1\right) + {}_{t0}\theta_w\left(2 - \frac{1}{p}\right)$$

Where p is given by:

$$p = \left(\frac{\lambda}{C_p \rho}\right)\left(\frac{t_1 - t_0}{w^2}\right)$$

Wherein λ is the Thermal Conductivity of the wall material, $C_p$ is the Specific Heat of the wall material, ρ is the density per cubic metre of the wall material, w is the width (thickness) of the wall and time $t_1$ is later than time $t_0$ ("later" in this context typically means a fraction of a second later, as measured according to the capabilities of the sensing device; the smaller the time increment, the more accurate the estimate).

The thickness of the wall material and the material itself will be discovered during the building survey, as described in step S100 and uploaded to the memory 501, as described in step S102; the reference data for Thermal Conductivity, Specific Heat and density of the given wall material can be easily found and uploaded to the memory 504; all this information is then available to the processing unit 500.

The thermal sensor 210 measures the radiant heat detected on the outer surface of the wall opposite at time $t_0$ and then again at a later time, $t_1$ (in reality, the temperature will be continually measured from time $t_0$, $t_1$ . . . $t_n$). This information is passed via the hub 400 to the Cloud Platform 601, specifically to the processing unit 500. Combined with the pre-loaded information for the other variables, the processing unit 500 then has access to all variables such that the computation of the temperature of the inner wall of the compartment at any given time becomes a simple, iterative process.

The above example assumes a simple case of a wall made of one type of homogenous material; in the case of composite walls (which would be determined by the survey), there are extra boundary layer calculations to perform and different thermal reference data for different materials, but this is all readily available and would present no problem for the processing unit 500.

Given that the compartment has multiple walls which will be exposed to one or more of devices 100, 200, 300 simultaneously, the processing unit will be able to calculate a plurality of internal temperature estimates for the enclosed compartment wherein the fire exists, on a continuous basis, for multiple height levels within the compartment; the ML components of the Cloud Platform 601 can then use boundary layer algorithms to estimate the centre of the fire in the compartment and the temperature of the gaseous products of combustion, from multiple data points, and pass this information to the CFD software 503, wherein the thermochemical processes can be modelled and predictions made about the fire's development (in particular, the risks of Rollover, Flashover and the probability of the fire spreading outside the compartment due to thermal degradation of the compartment walls).

Aspects of the invention where AI tools 599 can be effectively deployed involve the probabilistic modelling and interpretation of results; for example, the determination of a safe route out of a building taking into account not only the location of the fire and occupants, but also the likely path of the fire and possible behaviour of the occupants; further examples of where AI tools 599 can be deployed include; the recommendation of proposed firefighting interventions based on simulation of interventions and; interpretation of the results on the probabilistic models of said simulations.

It is also important to "train" the AI tools 599, in the cloud-based embodiment of the processing unit 500, in the simulation and interpretation of the results of fire modelling, especially for the probabilistic models of the fire and the simulation of firefighting interventions; this is achieved by running multiple simulations of real and theoretical building layouts and different fire and occupancy scenarios and, in preferred embodiments of the invention, this is a constantly running process in the background and uses a protocol of "train, validate and test".

In summary: the thermal sensors 110, 210, 310 and the carbon dioxide sensors 130, 230, 330 and the other aspects of the Appliance, for example the voice and data communications apparatus, are arranged throughout the building with each Appliance being integrated within, or mounted on, a fire and occupant safety device 100, 200, 300. (It is further envisaged that the said fire and occupant safety devices 100, 200, 300 may be mounted directly to a surface, for example a wall or ceiling, or in the case of the device 300 in a multi-occupancy building, may be installed inside a housing also containing a communications hub 400). These Appliances are then connected by wireless or wired means to the processing unit, typically one or more virtual devices installed in a "public" cloud infrastructure and with access to specific memory and computational resources including AI and ML.

These example fire and occupant safety devices and the processing unit 500 with which they interface and integrate with will now be described in further detail.

Mains socket faceplate 100

Thermal and carbon dioxide sensors integrated with a mains socket faceplate may be used to detect the presence or threat of a fire and/or the presence of a person if they are inserted into the faceplate. Preferably, the sensors may be positioned on the front of a mains socket faceplate 100 in order to achieve this; as already stated, the heat of a fire at or near floor level can be 5 times lower than the heat measurable at eye-level—since the maximum air temperature at which an unprotected person could survive for more than a few minutes is less than 80° C. (above which, third degree skin and potentially fatal respiratory burns will occur), it is likely that in the main socket faceplate housing the Appliance would contain only thermal sensors of the type which operate at up to 80° C.; these sensors would be directed out of the front of the faceplate and towards the centre of the room, in which circumstance they may detect, for example, children hiding under a bed.

In this way, it is likely that the primary purpose of the fire and occupant safety device 100 is to identify the presence of one or more people in its vicinity and to detect the early stage of a fire hazard.

As already noted, the ability to detect children hiding under a bed, or blanket, cannot be left to body heat detection alone as there are many factors which could hinder such measurement; this is why the detection of persons should be left to a combination of body heat and carbon dioxide. When exhaled from the human body and allowed to cool for a few seconds, carbon dioxide is denser than air at room temperature and therefore is slightly more concentrated at lower levels in a room. This is not to say that carbon dioxide exists in "layers" in a room, because it does not, and this is due to the fact that micro-currents of air are continuously stirring the atmosphere inside a room and ensuring a well-mixed distribution of gases, but that fact remains that carbon dioxide, unlike carbon monoxide and smoke, will be readily detected at a lower height in a room.

Through the combination of the two types of sensors, a fire and occupant safety device housed in a socket faceplate 100 can, in the same device, detect elevated temperatures and carbon dioxide levels that are indicative of the early-stage presence or risk of a fire, or of the presence of one or more persons.

Figure 4:
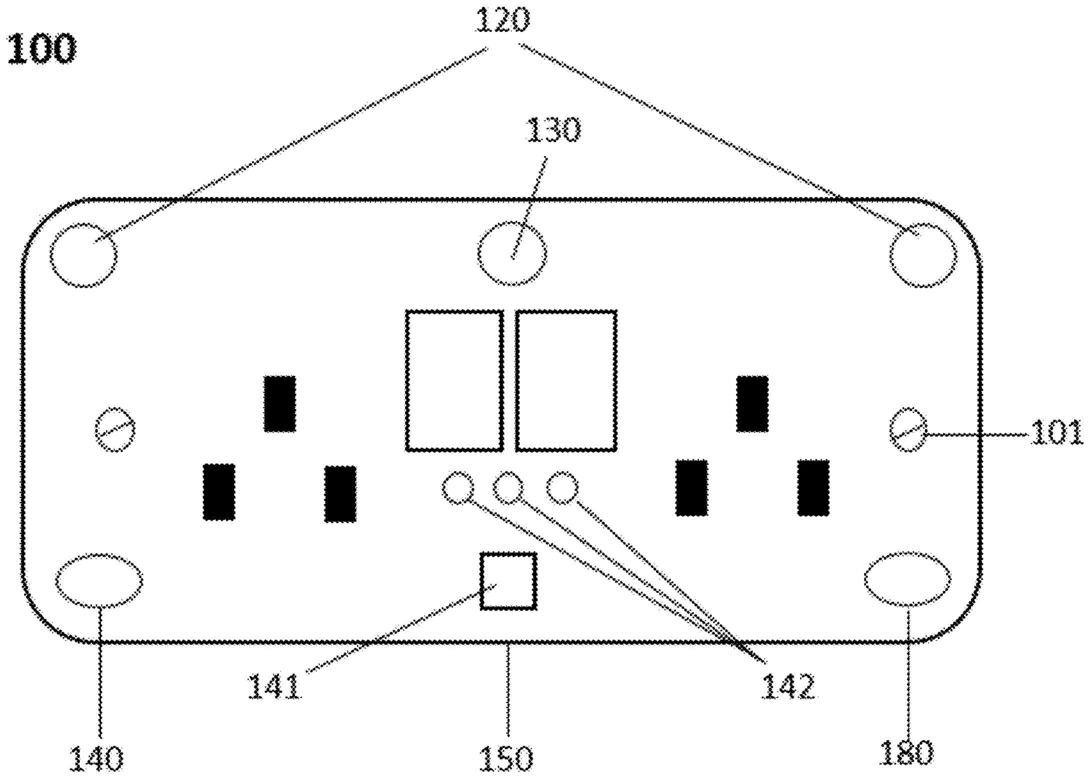
FIG. 4 illustrates a fire and occupant safety device in the form of a mains socket faceplate.

In the example of FIG. 4, the thermal sensor 120 is positioned within a housing 150 of the device 100 at two points, on the upper left and upper right corners of the faceplate. In this way, the thermal sensors can provide a contactless measurement of the surface temperature of an object in a wide field of view. The carbon dioxide sensor 130 is located in the middle upper portion of the faceplate housing 150, directly above the switches. The microphone 180 is a two-way microphone for receiving voice communications from one or more persons in the vicinity of the faceplate 100 and for broadcasting voice communications from a remote person or system; in other embodiments, the broadcasting of voice communication may come from the speaker of a voice assistant, such as Alexa™ to which the microphone 180 can be connected in a local mesh network. The foregoing configuration enables the Appliance, the fire and occupant safety device, to be housed in the socket faceplate and provide its full range of functions, without stopping the faceplate from fulfilling its other function of enabling the transmission of electrical power to an appliance, by means of a plug; this is advantageous in that it reduces the number of devices that are required in a typical residence by utilising the connections and locations of other devices, such as sockets, which are always present in a room in any event.

In the example of FIG. 4 the main socket face plate 100 comprises a double socket housing 150, affixed to the wall by screws 101, but such fire and occupant safety devices could equally have a single socket housing 150 or a greater number of sockets in the housing 150.

Although the thermal sensor 120 is primarily configured for detection of body heat, it can clearly indicate an actual fire source in its field of view, which itself burns at temperatures on excess of 600° C.; even though this is likely to be far above the measurement range of sensor 120, the sudden appearance of a heat source above 80° C. clearly indicates the presence or risk of fire. The thermal sensor 120 therefore allows for the early detection of temperature increases associated with possible fire hazards, typically within a compartment of the building; the thermal sensor 120 may also detect the increased IR radiation emitted by a person, and thereby the location of occupants within the building may be inferred (especially if they are hiding under a bed or item of furniture and directly within the field of view of the sensor 120).

The carbon dioxide sensor 130 is, in the case of the device 100, ideally located to detect respiratory carbon dioxide emissions indicative of the presence of one or more persons, especially if the body heat signal of those persons is blocked or reduced in strength by obstacles (furniture, coverings etc.).

The body heat temperature (~37° C.) of a person is captured and recorded on a constant basis by the thermal infrared sensor 120 placed on the upper left and upper right of the faceplate; the carbon dioxide level in the room is constantly monitored by the sensor 130 and compared to a pre-established baseline "norm"; these results are identified by a local processor located within the faceplate 100 (not shown) and continuously updated to the processing unit 500, wherein the device 100 communicates to the hub 400 via the local radio mesh network of which both devices form a part, such that the hub 400 then forwards the output of many other devices 100 to the processing unit 500; in some cases, the hub 400 may communicate with said third-party systems such as a fire-alarm system or a voice assistant such as Alexa™ by means of a wireless radio link, provided that said third-party systems are also connected to the processing unit 500; in this way, the fire and occupant safety devices are always connected in some way with the processing unit 500, even in the event of a loss of connectivity between the hub 400 and the processing unit 500.

In embodiments, in addition to the wireless mesh network connection between the device 100 and any hub 400, through which the fire and occupant safety devices communicate with the processing unit 500, each device 100 is configured so as to be capable of wireless communication directly with the processing unit 500. This will typically be achieved by configuring the devices 100 with a SIM of some kind, most likely a Narrowband Internet of Things (NBIOT) SIM card; in this scenario, any loss of communication between a particular device 100 and the processing unit 500 due to, for example, any of; a catastrophic failure of all devices 300, or all hubs 400, or of all third-party systems, or of all wired or wireless connectivity from the building to the internet, can be overcome by means of this independent "failover" communication capability between the device 100 and the processing unit 500. This is a form of redundancy of the last resort.

As already stated, the display of occupant location inside a private residence in a non-emergency situation is preferably governed by a privacy policy agreed between the Responsible Authority and the residents. Typically, no action is taken with this information in a non-emergency situation, other than to record said information, such that, should an emergency scenario be triggered, the information on occupant location can be represented and continually updated. It is an important feature of this invention that all devices 100, 200, 300 connected continuously in a wireless mesh network with one or more hubs 400, should constantly update each other and the processing unit 500, during non-emergency scenarios, with information regarding the location of occupants in the building but that this information should be displayed for human observation only in accordance with the pre-determined privacy policies already mentioned.

In the event of a fire emergency in the vicinity of the device 100, determined by the detection of a rapid increase in the temperature of an object above the maximum of the sensor (~80° C.) by the thermal sensor(s), or a rapid increase in carbon dioxide levels compared to a pre-established baseline "norm" by the sensor 130, the same local processor (not shown) located within the faceplate device 100 determines the presence of a possible fire risk and can take a number of actions.

The fire and occupant safety device 100 firstly comprises an internal alarm sounder 140 which is configured to sound when a hazard is detected in order to alert the occupants in the immediate surrounding area; in some embodiments, said processor in the faceplate 100 might send an alert a voice assistant such as Alex™, so that the occupants can be alerted to the threat of the fire in other rooms of the residence.

The data regarding the fire is then fed to a hub 400 to which the device 100 is connected, and thence to all other devices in the mesh network and any third-party systems to which the mesh network is connected (in the manner previously described) and ultimately to the processing unit 500, which would construct a current-state and probabilistic model of the fire, based on access to a memory containing the layout, construction methods and materials of the compartment and the building in general and CFD modelling software for fire simulation; the processing unit 500 would refer to an alert policy and further alerts sent to other occupants, by whatever means, would be in line with the pre-determined alert policy and the threat level of the fire. The representation of the location of the occupants on a digital visualisation of the building is subject to the privacy policy already mentioned.

As per FIG. 4, the fire and occupant safety device 100 contains a reset switch 141 for resetting the device 100 or silencing the alarm 140 when it is sounding. The electrical safety device 100 further comprises a series of status LEDs to indicate to a user that the device 100 is functioning correctly. In particular the device of FIG. 4 includes a corresponding LED to indicate the status for the network connectivity, the power to the device and the sounding of the alarm. The series of LEDs 142 are provided on the surface of the housing 150 to provide visual alert to the user. The series of LEDs 142 are provided on the surface of the housing 150 to provide visual alert to the user; in preferable embodiments, the green LEDS (indicative of a fully functional system) can be disabled so as not to shine, at night, and give off an intrusive light, if the device is installed in a room in which persons may be sleeping, this may be accomplished by a manual switch, or configured in an app downloaded on a smart phone, or may be automatically configured using a photosensitive cell to detect conditions of darkness. In addition to the LED indicators 142, in certain embodiments there may be a single white light LED (not shown) incorporated into the housing, which is capable of emitting a bright light in the case where a fire is detected in conjunction with poor ambient visibility (whether due to darkness or thick smoke), in order to help illuminate the surroundings for occupants trying to gain their bearings.

The fire and occupant safety device 100 may equally be configured to communicate via the wireless communications link with other user devices such as a smart TV, smart watch, or voice assistant such as Alexa™ or Siri™ or other devices to indicate the presence of a potential hazard and provide details on the hazard detected. The device 100 is also configured to send and receive voice communications, via the microphone 180, between one or more persons in the vicinity of the device and a remote system or persons, in order to establish the medical condition of any persons and to allow said remote device or person to communicate safety information to said persons.

The local processor of the device 100 is configured to determine the presence of a potential hazard by identifying when the value of a sensed parameter (e.g., temperature from the thermal sensor) exceeds a predetermined threshold value. Processing can happen both locally, within the local processor, and remotely within the cloud. However more complex processing may be used to identify the presence of a hazard, for example by identifying a rate of change of a sensed parameter or where a sensed parameter change displays a particular behaviour or pattern associated with an increased risk of a hazard. The local processor can also be configured to determine the presence of a hazard based on a combination of sensor outputs in order to identify a risk more reliably. For example, the processor can use more complex algorithms, such as machine learning based algorithms which take the output from multiple sensors in order to determine an elevated risk. For example, in a situation where the thermal sensor and carbon dioxide sensor readings are lower than their corresponding individual thresholds, the behaviour of the sensor readings in combination may signify a developing hazard and therefore this can be detected at an earlier stage than with a single sensor. Similarly, an unusual rate of change of one or more parameters may indicate the presence of a hazard. Data from the plurality of further sensors may be communicated to the processing unit 500 or via the device communications link and the smart hub 400 for further analysis and in particular identification of the hazard location; the development of the current-state and probabilistic fire models will happen exclusively in the processing unit 500, due to the computing power and memory resources and data required.

Light Switch Faceplate 200

Thermal and carbon dioxide sensors integrated with a light switch faceplate may be used to detect the presence or threat of a fire and/or the presence of a person if they are housed within the faceplate. Preferably, the sensors may be positioned on the front of a light switch faceplate 200 in order to achieve this; as already stated, the heat of a fire at or near floor level can be 5 times lower than the heat measurable at eye-level and in preferred embodiments one or more of the devices 200 will contain thermal sensors of the type which operate at up to 1,000° C. (thermal sensor 210); these sensors would be directed out of the front of the faceplate and towards the centre of the room, in which circumstance they may detect, for example, children hiding under a bed. In other embodiments, the thermal sensors may be of the type that detect temperatures up to 80° C. (thermal sensor 220) and in further embodiments the faceplate 200 may incorporate one or more of the sensors 210 and/or 220 in the same housing.

In this way, it is likely that the primary purpose of the fire and occupant safety device 200 is to identify the presence of one or more people in its vicinity and to detect the early stages of the development of a fire and, in some embodiments, to provide ongoing monitoring of the fire for the purposes of probabilistic modelling of an established fire; in such embodiments, the faceplate housing 250 may be covered in a heat insulating coating, for example Zircotec® performance thermal barrier plasma applied ceramic coatings or ZircoFlex® foil insulation, to provide thermal survivability of the fire and occupant safety device 200 inside the housing 250, for the purposes of continuous real-time monitoring of the fire in high ambient temperatures.

As already noted, the ability to detect children hiding under a bed, or blanket, cannot be left to body heat detection alone as there are many factors which could hinder such measurement; this is why the detection of persons should be left to a combination of body heat and carbon dioxide. When exhaled from the human body and allowed to cool for a few seconds, carbon dioxide is denser than air at room temperature and therefore is slightly more concentrated at lower levels in a room. This is not to say that carbon dioxide exists in "layers" in a room, because it does not, and this is due to the fact that micro-currents of air are continuously stirring the atmosphere inside a room and ensuring a well-mixed distribution of gases, but that fact remains that carbon dioxide, unlike carbon monoxide and smoke, will be readily detected at a lower height in a room.

Through the combination of the one or more type of thermal sensor and the carbon dioxide sensor, a fire and occupant safety device housed in a light switch faceplate 200 can, in the same device, detect elevated temperatures and carbon dioxide levels that are indicative of the early-stage presence or risk of a fire, or of the presence of one or more persons.

Figure 5A:
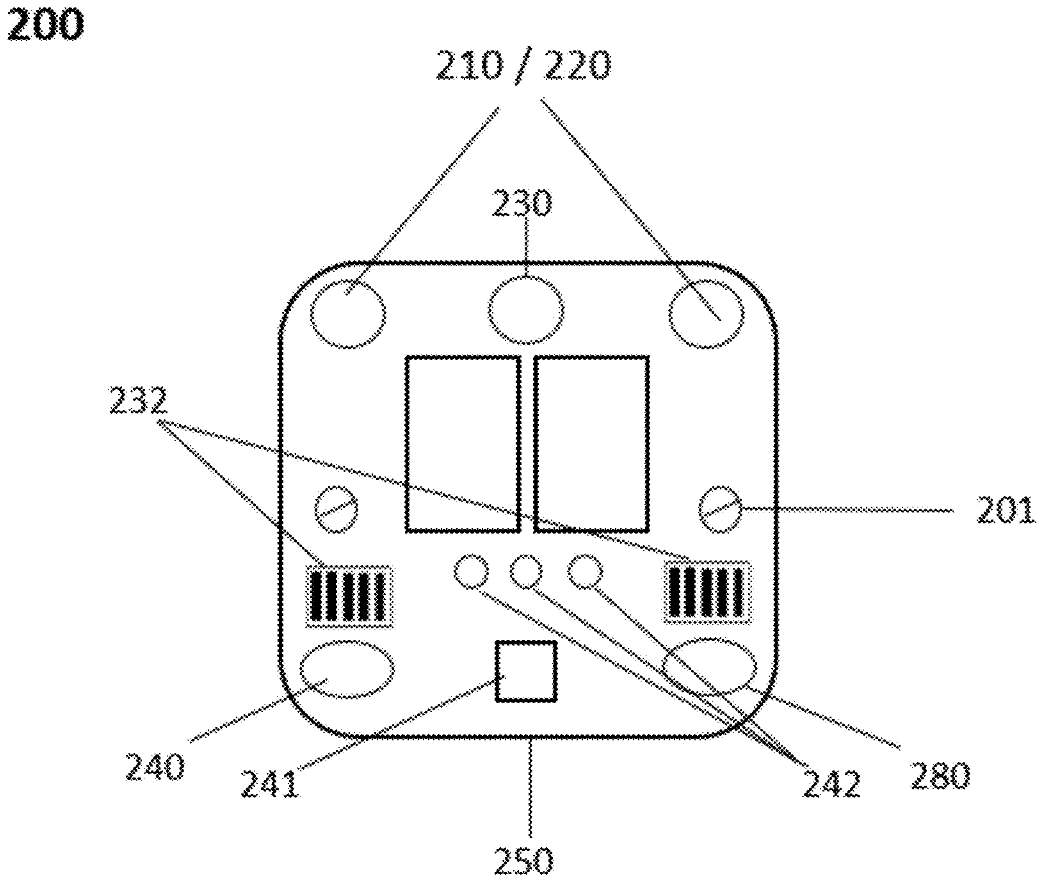
FIGS. 5A and 5B illustrates a fire and occupant safety device in the form of a light switch faceplate.

In the example of FIG. 5A, the thermal sensor 220 is positioned within a housing 250 of the device 200 at two points, on the upper left and upper right corners of the faceplate; in some embodiments, the thermal sensor 210 may take the place of one or both of the sensors 220. In this way, the thermal sensors can provide a contactless measurement of the surface temperature of an object in a wide field of view. The carbon dioxide sensor 230 is located in the middle upper portion of the faceplate housing 250, directly above the light switches. The microphone 280 is a two-way microphone for receiving voice communications from one or more persons in the vicinity of the faceplate 200 and for broadcasting voice communications from a remote person or system; in other embodiments, the broadcasting of voice communication may come from the speaker of a voice assistant, such as Alexa™, to which the microphone 280 can be connected in a local mesh network. The foregoing configuration enables the Appliance, the fire and occupant safety device, to be housed in the light-switch faceplate and provide its full range of functions, without stopping the faceplate from fulfilling its other function of enabling the switching on or off of an electrical light bulb; this is advantageous in that it reduces the number of devices that are required in a typical residence by utilising the connections and locations of other devices, such as light switches, which are always present in a room in any event.

In the example of FIG. 5A the light switch faceplate housing 250 comprises two switches, affixed to the wall by screws 201, but the light switch housing 250 could equally have a single switch or a greater number of switches.

Although the thermal sensor 220 is primarily configured for detection of body heat, it can clearly indicate an actual fire source in its field of view, which itself burns at temperatures on excess of 600° C.; even though this is likely to be far above the measurement range of sensor 220, the sudden appearance of a heat source above 80° C. clearly indicates the presence or risk of fire. The thermal sensor 220 therefore allows for the early detection of temperature increases associated with possible fire hazards, typically within a compartment of the building; the thermal sensor 220 may also detect the increased IR radiation emitted by a person, and thereby the location of occupants within the building may be inferred (especially if they are hiding under a bed or item of furniture and directly within the field of view of the sensor 220). The thermal sensor 210, if fitted, can monitor ambient temperatures up to 1,000° C. and is therefore preferred if the function of the device 200 is not only to report a fire but also to monitor the heat of the fire and the ambient temperature, for the purpose of constantly updating the probabilistic models constructed by the processing unit 500; the decision on how many of the devices 200 should incorporate the sensor 210 will be down to the Responsible Authority and be based on budgetary considerations and the layout and occupancy of the building. The smoke sensors 232 are on the unit housing 250, as illustrated in FIG. 5A.

The carbon dioxide sensor 230 is, in the case of the socket faceplate 200, ideally located to detect respiratory carbon dioxide emissions indicative of the presence of one or more persons, especially if the body heat signal of those persons is blocked or reduced in strength by obstacles (furniture, coverings etc.)

The body heat temperature (~37° C.) of a person is captured and recorded on a constant basis by the thermal infrared sensors 210 and/or 220 placed on the front of the faceplate; the carbon dioxide level in the room is constantly monitored by the sensor 230 and compared to a pre-established baseline "norm"; these results are identified by a local processor located within the faceplate 200 (not shown) and continuously updated to the processing unit 500, wherein the device 200 communicates to the hub 400 via the local radio mesh network of which both devices form a part, such that the hub 400 then forwards the output of many other devices 200 to the processing unit 500; in some cases, the hub 400 may communicate with said third-party systems such as a fire-alarm system or a voice assistant such as Alexa™ by means of a wireless radio link, provided that said third-party systems are also connected to the processing unit 500; in this way, the fire and occupant safety devices are always connected in some way with the processing unit 500, even in the event of a loss of connectivity between the hub 400 and the processing unit 500.

In embodiments, in addition to the wireless mesh network connection between the device 200 and any hub 400, through which the fire and occupant safety devices communicate with the processing unit 500, each device 200 is configured so as to be capable of wireless communication directly with the processing unit 500. This will typically be achieved by configuring the devices 200 with a SIM of some kind, most likely a Narrowband Internet of Things (NBIOT) SIM card; in this scenario, any loss of communication between a particular device 200 and the processing unit 500 due to, for example, any of; a catastrophic failure of all devices 300, or all hubs 400, or of all third-party systems, or of all wired or wireless connectivity from the building to the internet, can be overcome by means of this independent "failover" communication capability between the device 200 and the processing unit 500. This is a form of redundancy of the last resort.

As already stated, the display of occupant location inside a private residence in a non-emergency situation is preferably governed by a privacy policy agreed between the Responsible Authority and the residents. No action is taken with this information other than to record it such that, should an emergency scenario be triggered, the information on occupant location can be represented and continually updated. It is an important feature of this invention that all devices 100, 200, 300 connected continuously in a wireless mesh network with one or more hubs 400, which should constantly update each other and the processing unit 500, during non-emergency scenarios, with information regarding the location of occupants in the building but that this information should be displayed for human observation only in accordance with the pre-determined privacy policies already mentioned.

In the event of a fire emergency in the vicinity of the device 200, determined by the detection of a rapid increase in the temperature of an object above the maximum of the sensor (~80° C.) by the thermal sensors 210 and/or 220, or a rapid increase in carbon dioxide levels compared to a pre-established baseline "norm" by the sensor 230, the same local processor (not shown) located within the faceplate device 200 determines the presence of a possible fire risk and can take a number of actions.

The fire and occupant safety device 200 firstly comprises an internal alarm sounder 240 which is configured to sound when a hazard is detected in order to alert the occupants in the immediate surrounding area; in some embodiments, said processor in the faceplate 200 might send an alert a voice assistant such as Alexa™, so that the occupants can be alerted to the threat of the fire in other rooms of the residence.

The data regarding the fire is then fed to a hub 400 to which the device 200 is connected, and thence to all other devices in the mesh network and any third-party systems to which the mesh network is connected (in the manner previously described) and ultimately to the processing unit 500, which would construct a current-state and probabilistic model of the fire, based on access to a memory containing the layout, construction methods and materials of the compartment and the building in general and CFD modelling software for fire simulation; the processing unit 500 would refer to an alert policy and further alerts sent to other occupants, by whatever means, would be in line with the pre-determined alert policy and the threat level of the fire. The representation of the location of the occupants on a digital visualisation of the building is subject to the privacy policy already mentioned.

The fire and occupant safety device 200 contains a reset switch 241 for resetting the device 200 or silencing the alarm 240 when it is sounding. The electrical safety device 200 further comprises a series of status LEDs to indicate to a user that the device 200 is functioning correctly. In particular the device of FIG. 5A includes a corresponding LED to indicate the status for the network connectivity, the power to the device and the sounding of the alarm. The series of LEDs 242 are provided on the surface of the housing 250 to provide visual alert to the user; in preferable embodiments, the green LEDS (indicative of a fully functional system) can be disabled so as not to shine, at night, and give off an intrusive light, if the device is installed in a room in which persons may be sleeping; this may be accomplished by a manual switch, or configured in an app downloaded on a smart phone, or may be automatically configured using a photosensitive cell to detect conditions of darkness. In addition to the LED indicators 242, in certain embodiments there may be a single white light LED (not shown) incorporated into the housing, which is capable of emitting a bright light in the case where a fire is detected in conjunction with poor ambient visibility (whether due to darkness or thick smoke), in order to help illuminate the surroundings for occupants trying to gain their bearings.

The fire and occupant safety device 200 may equally be configured to communicate via the wireless communications link with other user devices such as a smart TV, smart watch, or voice assistant such as Alexa™ or Siri™ or other devices to indicate the presence of a potential hazard and provide details on the hazard detected. The device 200 is also configured to send and receive voice communications, via the microphone 280, between one or more persons in the vicinity of the device and a remote system or persons, in order to establish the medical condition of any persons and to allow said remote device or person to communicate safety information to said persons.

The local processor of the device 200 is configured to determine the presence of a potential hazard by identifying when the value of a sensed parameter (e.g., temperature from the thermal sensor) exceeds a predetermined threshold value. Processing can happen both locally, within the local processor, and remotely within the cloud. However more complex processing may be used to identify the presence of a hazard, for example by identifying a rate of change of a sensed parameter or where a sensed parameter change displays a particular behaviour or pattern associated with an increased risk of a hazard. The local processor can also be configured to determine the presence of a hazard based on a combination of sensor outputs in order to identify a risk more reliably. For example, the processor can use more complex algorithms, such as machine learning based algorithms which take the output from multiple sensors in order to determine an elevated risk. For example, in a situation where the thermal sensor and carbon dioxide sensor readings are lower than their corresponding individual thresholds, the behaviour of the sensor readings in combination may signify a developing hazard and therefore this can be detected at an earlier stage than with a single sensor. Similarly, an unusual rate of change of one or more parameters may indicate the presence of a hazard. Data from the plurality of further sensors may be communicated to the processing unit 500 or via the device communications link and the smart hub 400 for further analysis and in particular identification of the hazard location, the development of the current-state and probabilistic fire models will happen exclusively in the processing unit 500, due to the computing power and memory resources and data required.

Figure 5B:
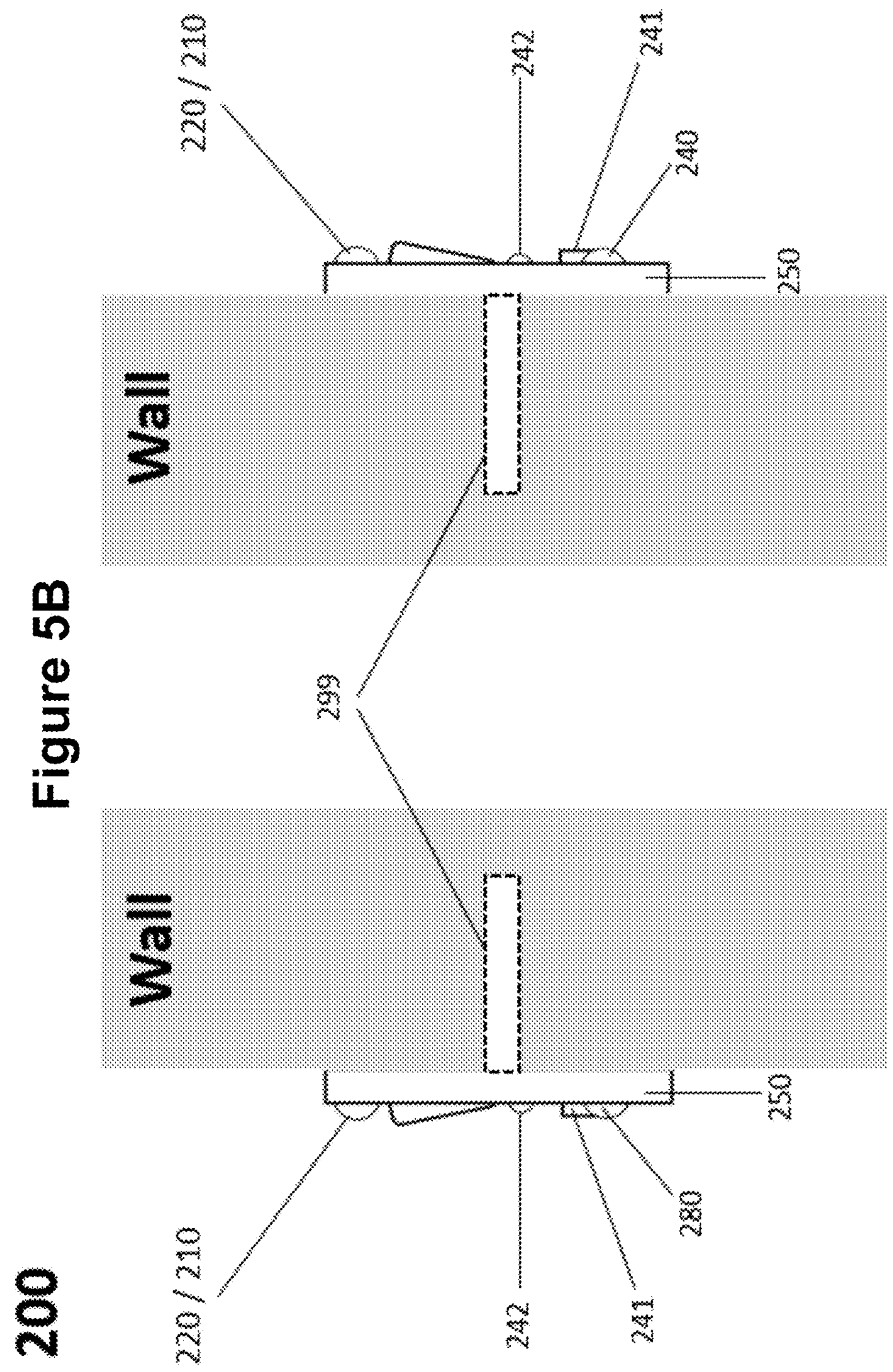

FIG. 5B shows, by way of example, a further possible embodiment of the invention wherein a thermocouple probe 299 is inserted into the wall into which the faceplate device 200 and switch housing 250 is affixed, from the back of the faceplate 200; the thermocouple 299 measures the temperature of the material of the wall at various points and feeds this information into the processor (not shown) in the device 200. The processor in the device 200 can then monitor the rate of change of the temperature of the wall, if required; this is one of the methods for estimating the internal temperature of the compartment which may be on fire, from outside the compartment (other methods, including contactless methods not involving a thermocouple, as illustrated in FIG. 9, are also possible).

Wall/Ceiling Device 300 & Hub 400

Figure 6A:
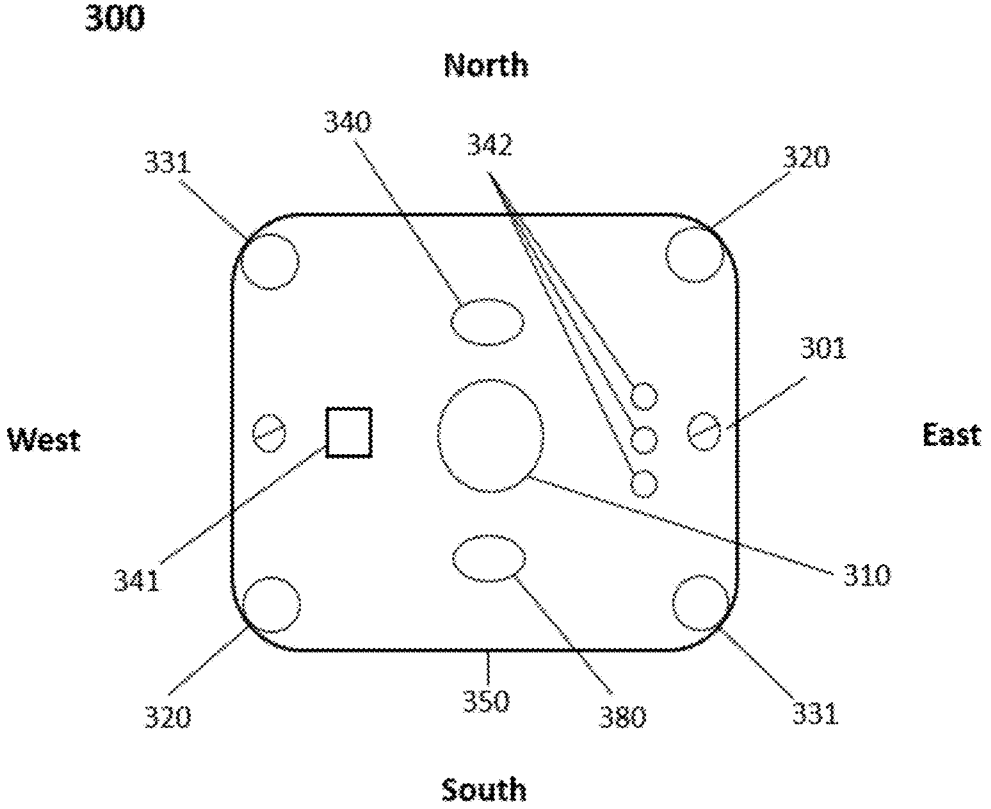
FIGS. 6A and 6B illustrates a fire and occupant safety device in the form of a ceiling unit, with FIG. 6A showing the unit from below, as it would appear when viewed from the room beneath the ceiling to which it is mounted and FIG. 6B showing the devices in elevation view from the North, East. South and West (as arbitrary reference points), when the unit is mounted on a ceiling.
Figure 6B:
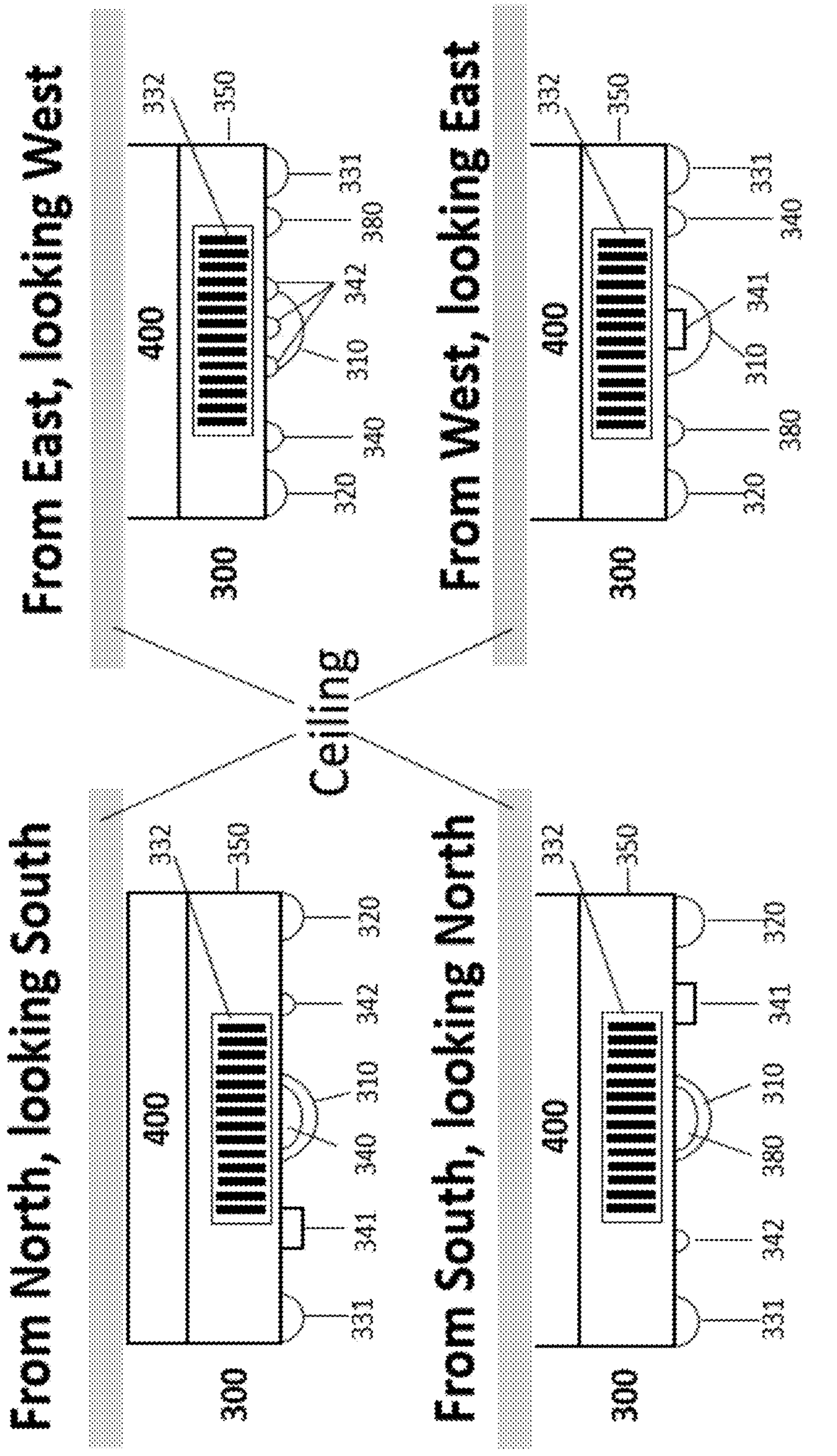

A further fire safety device that may be used within the fire safety system of the present invention is a wall- or ceiling-mounted unit 300 (shown in FIGS. 6A and 6B). The device 300 comprises one or more infrared array sensors moulded into the housing of the device so as to face outwards form the device housing. In this way, the thermal sensor provides a large field of view that is particularly advantageous for monitoring large areas such as rooms or corridors. Consequently, one or more fire safety devices in the form of a wall/ceiling unit 300 may be arranged within a building in communal areas of a multiple-occupancy building, such as corridors and stairwells.

Thermal and carbon dioxide sensors integrated with a wall/ceiling mounted device 300 may be used to detect the presence or threat of a fire and/or the presence of a person if they are housed within the unit. Preferably, the unit 300 is placed on the ceiling in the middle of a room or communal area; the following description is for a ceiling mounted unit; the wall mounted unit would, apart from being mounted in a vertical rather than horizontal plane, operate in an identical manner in all aspects.

Preferably, sensors may be positioned on the base of the device 300 (if ceiling mounted) in order to detect the presence or risk of fire and/or the presence of one or more people; as already stated, the heat of a fire at or near floor level can be 5 times lower than the heat measurable at eye-level and in preferred embodiments one or more of the devices 300 will contain thermal sensors of the type which operate at up to 1,000° C. (thermal sensor 310); these sensors would be directed out of the base of the unit downwards into the compartment and towards the centre of the room, in which circumstance they may detect, for example, children hiding under a bed. In other embodiments, the thermal sensors may be of the type that detect temperatures up to 80° C. (thermal sensor 320) and in further embodiments the device 300 may incorporate one or more of the sensors 310 and/or 320 in the same housing (as per FIGS. 6A and 6B).

In this way, it is likely that the primary purpose of the fire and occupant safety device 300 is to identify the presence of one or more people in its vicinity and to detect the early stages of the development of a fire and, in some embodiments, to provide ongoing monitoring of the fire for the purposes of probabilistic modelling of an established fire; in such embodiments, the unit housing 350 may be covered in a heat insulating coating, for example Zircotec® performance thermal barrier plasma applied ceramic coatings or ZircoFlex® foil insulation, to provide thermal survivability of the fire and occupant safety device 300 inside the housing 350, for the purposes of continuous real-time monitoring of the fire in high ambient temperatures.

As already noted, the ability to detect children hiding under a bed, or blanket, cannot be left to body heat detection alone as there are many factors which could hinder such measurement; this is why the detection of persons should be left to a combination of body heat and carbon dioxide. When exhaled from the human body and allowed to cool for a few seconds, carbon dioxide is denser than air at room temperature and therefore is slightly more concentrated at lower levels in a room. This is not to say that carbon dioxide exists in “layers” in a room, because it does not, and this is due to the fact that micro-currents of air are continuously stirring the atmosphere inside a room and ensuring a well-mixed distribution of gases, but that fact remains that carbon dioxide, unlike carbon monoxide and smoke, will be readily detected at a lower height in a room. However, carbon dioxide from combustion is hotter than air and less dense and tends to rise; therefore, the detection of sharply increased levels of carbon dioxide at ceiling level is a likely indication of the presence of a fire.

Through the combination of the one or more type of thermal sensor and the carbon dioxide sensor, a fire and occupant safety device housed in a device 300 can, in the same device, detect elevated temperatures and carbon dioxide levels that are indicative of the early-stage presence or risk of a fire, or of the presence of one or more persons.

In the example of FIGS. 6A and 6B, the thermal sensor 320 is positioned within a housing 350 of the device 300 at two points, on diagonally opposite corners of the faceplate on the base of the unit; in some embodiments, the thermal sensor 310 may take the place of one of the sensors 320, or (as in the case of FIG. 6A, by way of example only) may be located in the middle of the faceplate of the housing 350 in addition to the two thermal sensors 320 in the corners. In this way, the thermal sensors can provide a contactless measurement of the surface temperature of an object in a wide field of view in the compartment below.

In some embodiments, the carbon dioxide sensor 330 is located in one corner of the of the faceplate 350 and a carbon monoxide detector 331 is located diagonally opposite the carbon dioxide detector; in other, preferred, embodiments the sensor 331 is a multi-gas detector of the NDIR (Non-Dispersive Infra-Red) type, capable of detecting the molecular presence of multiple gases including; carbon dioxide; carbon monoxide; hydrogen cyanide; hydrogen chloride; sulphur dioxide and nitrogen dioxide, in the one sensor housing, such that the detectors 331 replace the simple mono-gas detector 330 (although the sensor 331 is more expensive than the sensor 330), wherein two sensors 331 are located diagonally opposite each other on the faceplate 350; this is the configuration illustrated in FIG. 6B, by way of example only.

Regardless of the configuration of sensors 330 and/or 331, the smoke sensors 332 are located on all sides of the unit housing 350, as illustrated in FIG. 6B. The microphone 380 is a two-way microphone for receiving voice communications from one or more persons in the vicinity of the device 300 and for broadcasting voice communications from a remote person or system; in other embodiments, the broadcasting of voice communication may come from the speaker of a voice assistant, such as Alexa™, to which the microphone 380 can be connected in a local mesh network.

Preferably in embodiments in the case of a multi-occupancy building, the device 300 is incorporated within the same housing as the communications hub 400 and affixed to the wall/ceiling by screws 301, but the device 300 could also be a physically separate device from the hub 400 in certain embodiments (in particular, in the case of a single occupancy building). The incorporation of the device 300 within the same housing as the hub 400 is illustrated in FIG. 6B.

Although the thermal sensor 320 is primarily configured for detection of body heat, it can clearly indicate an actual fire source in its field of view, which itself burns at temperatures on excess of 600° C.; even though this is likely to be far above the measurement range of sensor 320, the sudden appearance of a heat source above 80° C. clearly indicates the presence or risk of fire. The thermal sensor 320 therefore allows for the early detection of temperature increases associated with possible fire hazards, typically within a compartment of the building; the thermal sensor 320 may also detect the increased IR radiation emitted by a person, and thereby the location of occupants within the building may be inferred (especially if they are hiding under a bed or item of furniture and directly within the field of view of the sensor 320). The thermal sensor 310, if fitted, can monitor ambient temperatures up to 1,000° C. and is therefore preferred if the function of the device 300 is not only to report a fire but also to monitor the heat of the fire and the ambient temperature, for the purpose of constantly updating the probabilistic models constructed by the processing unit 500; the decision on how many of the devices 300 should incorporate the sensor 310 will be down to the Responsible Authority and be based on budgetary considerations and the layout and occupancy of the building.

The carbon dioxide sensor 330 is, in the case of the device 300, ideally located to detect respiratory carbon dioxide emissions indicative of the presence of one or more persons, especially if the body heat signal of those persons is blocked or reduced in strength by obstacles (furniture, coverings etc.)

The body heat temperature (~37° C.) of a person is captured and recorded on a constant basis by the thermal infrared sensors 310 and/or 320 placed on the base faceplate 350 of the device 300; the carbon dioxide level in the room is constantly monitored by the sensor 330 and compared to a pre-established baseline "norm"; these results are identified by a local processor located within the device 300 (not shown) and continuously updated to the processing unit 500, wherein the device 300 communicates to the hub 400 via the local radio mesh network of which both devices form a part, or by direct physical wired or wireless connections if the device 300 and hub 400 are incorporated in the same physical housing, such that the hub 400 then forwards the output of many other devices 300 to the processing unit 500; in some cases, the hub 400 may communicate with said third-party systems such as a fire-alarm system or a voice assistant such as Alexa™ by means of a wireless radio link, provided that said third-party systems are also connected to the processing unit 500; in this way, the fire and occupant safety devices are always connected in some way with the processing unit 500, even in the event of a loss of connectivity between the hub 400 and the processing unit 500.

In embodiments, in addition to the wireless and/or wired mesh network connection between the device 300 and any hub 400, through which the fire and occupant safety devices communicate with the processing unit 500, each device 300 is configured so as to be capable of wireless communication directly with the processing unit 500. In the event that the device 300 and the hub 400 are incorporated in the same housing, this will typically be achieved by incorporating a SIM of some kind, most likely a Narrowband Internet of Things (NBIOT) SIM card, which connects to the internet and thus to the cloud 600 and processing unit 500 residing therein; in the case where the device 300 and the hub 400 are in separate physical devices, the above will typically be achieved by configuring the devices 300 with a SIM of some kind, most likely a Narrowband Internet of Things (NBIOT) SIM card; in this scenario, any loss of communication between a particular device 300 and the processing unit 500 due to, for example, any of; a catastrophic failure of all devices 300, or all hubs 400, or of all third-party systems, or of all wired or wireless connectivity from the building to the internet, can be overcome by means of this independent "failover" communication capability between the device 300 and the processing unit 500. This is a form of redundancy of the last resort.

As already stated, the display of occupant location inside a private residence in a non-emergency situation is preferably governed by a privacy policy agreed between the Responsible Authority and the residents. No action is taken with this information other than to record it such that, should an emergency scenario be triggered, the information on occupant location can be represented and continually updated. It is an important feature of this invention that all devices 100, 200, 300 connected continuously in a wireless mesh network with one or more hubs 400, should constantly update each other and the processing unit 500, during non-emergency scenarios, with information regarding the location of occupants in the building but that this information should be displayed for human observation only in accordance with the pre-determined privacy policies already mentioned.

In the event of a fire emergency in the vicinity of the device 300, determined by the detection of a rapid increase in the temperature of an object above the maximum of the sensor (~80° C.) by the thermal sensors 310 and/or 320, or a rapid increase in carbon dioxide levels compared to a pre-established baseline "norm" by the sensor 330, the same local processor (not shown) located within the device 300 determines the presence of a possible fire risk and can take a number of actions.

The fire and occupant safety device 300 firstly comprises an internal alarm sounder 340 which is configured to sound when a hazard is detected in order to alert the occupants in the immediate surrounding area; in some embodiments, said processor in the device 300 might send an alert a voice assistant such as Alexa™, so that the occupants can be alerted to the threat of the fire in other rooms of the residence.

The data regarding the fire is then fed to a hub 400 to which the device 300 is connected (by wireless or wired means), and thence to all other devices in the mesh network and any third-party systems to which the mesh network is connected (in the manner previously described) and ultimately to the processing unit 500, which would construct a current-state and probabilistic model of the fire, based on access to a memory containing the layout, construction methods and materials of the compartment and the building in general and CFD modelling software for fire simulation; the processing unit 500 would refer to an alert policy and further alerts sent to other occupants, by whatever means, would be in line with the pre-determined alert policy and the threat level of the fire. The representation of the location of the occupants on a digital visualisation of the building is subject to the privacy policy already mentioned.

The fire and occupant safety device 300 contains a reset switch 341 for resetting the device 300 or silencing the alarm 340 when it is sounding. The device 300 further comprises a series of status LEDs to indicate to a user that the device 300 is functioning correctly. In particular the device of FIG. 6A includes a corresponding LED to indicate the status for the network connectivity, the power to the device and the sounding of the alarm. The series of LEDs 342 are provided on the surface of the housing 350 to provide visual alert to the user. The series of LEDs 342 are provided on the surface of the housing 350 to provide visual alert to the user; in preferable embodiments, the green LEDS (indicative of a fully functional system) can be disabled so as not to shine, at night, and give off an intrusive light, if the device is installed in a room in which persons may be sleeping; this may be accomplished by a manual switch, or configured in an app downloaded on a smart phone, or may be automatically configured using a photosensitive cell to detect conditions of darkness. In addition to the LED indicators 342, in certain embodiments there may be a single white light LED (not shown) incorporated into the housing, which is capable of emitting a bright light in the case where a fire is detected in conjunction with poor ambient visibility (whether due to darkness or thick smoke), in order to help illuminate the surroundings for occupants trying to gain their bearings.

The fire and occupant safety device 300 may equally be configured to communicate via the wireless communications link with other user devices such as a smart TV, smart watch, or voice assistant such as Alexa™ or Siri™ or other devices to indicate the presence of a potential hazard and provide details on the hazard detected. The device 300 is also configured to send and receive voice communications, via the microphone 380, between one or more persons in the vicinity of the device and a remote system or persons, in order to establish the medical condition of any persons and to allow said remote device or person to communicate safety information to said persons.

The local processor of the device 300 is configured to determine the presence of a potential hazard by identifying when the value of a sensed parameter (e.g., temperature from the thermal sensor) exceeds a predetermined threshold value. Processing can happen both locally, within the local processor, and remotely within the cloud. However more complex processing may be used to identify the presence of a hazard, for example by identifying a rate of change of a sensed parameter or where a sensed parameter change displays a particular behaviour or pattern associated with an increased risk of a hazard. The local processor can also be configured to determine the presence of a hazard based on a combination of sensor outputs in order to identify a risk more reliably. For example, the processor can use more complex algorithms, such as machine learning based algorithms which take the output from multiple sensors in order to determine an elevated risk. For example, in a situation where the thermal sensor and carbon dioxide sensor readings are lower than their corresponding individual thresholds, the behaviour of the sensor readings in combination may signify a developing hazard and therefore this can be detected at an earlier stage than with a single sensor. Similarly, an unusual rate of change of one or more parameters may indicate the presence of a hazard. Data from the plurality of further sensors may be communicated to the processing unit 500 or via the device communications link and the smart hub 400 for further analysis and in particular identification of the hazard location, the development of the current-state and probabilistic fire models will happen exclusively in the processing unit 500, due to the computing power and memory resources and data required.

As well as one or more infrared array sensors (310 and/or 320) and a carbon dioxide sensor 330 or multi-gas detector 331, the wall/ceiling unit 300 may also comprise; an internal alarm sounder 340; an internal battery (not shown) and further may in some embodiments also comprise any of the following additional sensors (not shown) designed to provide supplementary information to the processing unit 500, in order to improve the accuracy of the probabilistic modelling of the fire; a smoke sensor; a smoke density sensor (utilising either opacity or optical density); an oxygen sensor; an airflow sensor.

In some embodiments, the device 300 may also be equipped with a Radio Frequency Identification (RFID) antenna and reader (not shown), so as to be able to identify the presence of one or more firefighters in the vicinity if they are equipped with wearable or portable RFID tags.

Furthermore, the device 300 will incorporate a processor configured to receive signals from the various sensors listed above, analyse these signals to determine whether they are indicative of the presence of a potential hazard or presence of one or more people, alert the user via the internal alarm sounder and, in conjunction with the previously described fire and occupant safety devices 100 and 200, send this information and analysis to the hub 400.

The hub 400 comprises a communication link configured to send the data obtained by the thermal sensor to the cloud 600, wherein in preferable embodiments the processing unit 500 is situated. In a single occupancy building, it is likely and preferred that the hub 400 may be separate to each of the fire and occupant safety devices 100, 200, 300 described above; in the case of a multi-occupancy building, the hub 400 is integrated within one of the fire safety devices; typically, the hub may be integrated into the same housing with a fire and occupant safety device 300. These two methods are illustrated in FIGS. 3A and 3B.

Cloud Platform 601

In preferred embodiments, the processing unit 500 is a virtual computing device (a computational system wherein the computing processor, memory and storage is separated from the underlying physical hardware) and which has access to data and executable code relating to said data, located in the cloud 600 and connected to the internet by means of a communications device, or "layer", which may itself also be a virtual device or cloud server.

The cloud environment may be "private" (i.e., the computing software and memory is run on an array of dedicated physical hardware inside a specific datacentre), or "public" (i.e., provided by one of the "hyperscale" cloud providers such as Amazon Web Services®, Microsoft Azure®, Google® Cloud Platform® wherein the computing platforms are "elastic", meaning infinitely and almost instantly scalable and run on non-dedicated hardware simultaneously in multiple and physically separate data-centres), or they may be "hybrid" which is a mixture of both types previously mentioned, wherein the main processing is undertaken by the private cloud environment and the public cloud is used for "burst-outs", whereby a sudden and dramatic spike in computational resource requirement, such as in the event of a fire, is dealt with by utilising the elastic computing capability of the public cloud.

For the purposes of example only, the following description is based on a high-level design for deploying the processing unit 500 inside a public cloud 600 running on Amazon Web Services®, noting that other cloud platforms are equally viable.

As illustrated by FIGS. 3A and 3B, the connections from the one or more hubs 400 to the cloud 600 are likely to be a combination of wireless or wired, depending on whether the building is multi-occupancy or single occupancy (wireless only in the case of multi-occupancy, wired or wireless in the case of single occupancy).

The distinction between single and multi-occupancy buildings is important from a network architecture perspective, a single occupancy building is likely to be a single digital entity in the form of a Local Area Network (LAN) which pervades the entire building through a local mesh network which is wired, wireless or more likely both and will have an interface with the internet such as a router, which by virtue of the single occupancy can be stored in a safe and secure location. In such a case, the devices 400 can communicate with the router by means of the LAN and thence to the cloud and receive communications back from the cloud by the same route. Alternatively, the fire and occupant safety system could be configured to have its own separate mesh network and its own internet router for the purpose described in the foregoing and, for reasons of system resiliency and redundancy, this is the recommended approach. As previously stated, the devices 400 will always have an independent means to wirelessly communicate with the internet via NBIOT SIMs, which is necessary for full system redundancy in case the router connectivity to the internet is lost (for example, a fire, water leak or power cut could disable the router).

As already stated in the case of a multi-occupancy building, there will usually not be a single network within the building, and this is most often the case when the multi-occupancy building is a residential block. In such a case, there may not be a suitable and safe location for an internet router and most likely there will be no LAN for the building as a single "digital entity"; in this example, the preferred architecture is for each of the devices 400 to have wireless communication directly with the cloud 600, preferably by using NBIOT SIMs.

Information from the fire and safety devices 100, 200, 300 will, in preferable embodiments, communicate with the processing unit 500 via a hub 400 and the cloud 600, with the hub 400 and the device 300 incorporated in the same housing; this is the preferred configuration for the invention and is utilised in the following description.

During a non-emergency situation the location of one or more people will be constantly monitored by means of thermal sensors and carbon dioxide sensors in devices 100, 200, 300 and communicated to the processing unit 500; the information from both sensor types will be cross-referenced with each other and further with a memory 501 storing the layout of the building by the processing unit 500, so that the carbon dioxide levels appropriate to a given number of identified body heat signatures in a given location, with possibly varying airflows, can be established and used as a "baseline" value, to compare with later on in the event of a fire when, for example, individuals may hide or be rendered unconscious and their body heat signals may be hidden or impaired. Together with the application of Machine Learning (ML) tools 598, the ongoing monitoring and evaluation of carbon dioxide baselines is an important tool for "training" the Artificial Intelligence (AI) components 599 of the system in how to recognise the presence of one or more people from multiple sensed parameters.

The processing unit also references a privacy protocol, stored in said memory 501, which defines the manner and extent to which information regarding the location of one or more persons is displayed to remote or user devices during a non-emergency situation, this is for reasons of privacy. In preferred embodiments, the processing unit will not display the locations of one or more persons when no fire is detected in the building, but it is important to note that while the processing unit 500 will not display such information to a remote user when no emergency is present, it will always possess such information within its own memory, such that in the event of a fire suddenly being detected, the processing unit 500 will immediately have up to date information on the location and distribution of persons throughout the building.

When a fire is detected by any device 100, 200, 300, the information gathered by the appropriate sensors detecting the fire is fed back to the processing unit 500. The processing unit accesses Computational Fluid Dynamics (CFD) software 503 which has been pre-loaded and is configured to model the effects of fire, based on the real-time information on the physical characteristics of the fire (heat, smoke, gases) as reported by one or more of the devices 100, 200, 300 in the vicinity of the fire. The modelling of the fire will be described separately later in this section.

Armed with current-state and probabilistic state models of the fire, the processing unit can then refer to a memory 502 comprising an alert and evacuation policy based on the assessed severity of the fire threat; such a policy may, by way purely of example, contain protocols such that; in the event of the fire staying or likely to stay within the compartment of origin, the compartment occupants and the occupants of the immediately adjoining compartments (if any) are alerted by registered smartphone; in the event of the fire escaping or likely to escape from the compartment of origin, the occupants of all compartments on that floor might be alerted; in the event of the fire escaping or likely to escape the floor of origin, all occupants of the floors above might be alerted and so on. Many variants are possible and will preferably be defined by the Responsible Authority working with the Fire Authorities, in advance of deploying the fire and occupant safety system. It would be expected that in all circumstances of fire, the devices detecting said fire locally will always sound their individual local alarms and the fire service will always automatically be alerted.

Once the alert and evacuation policy appropriate to the perceived fire risk has been identified, the appropriate information on the location and nature of the fire, the location of the occupants and the plotted escape routes will be calculated by the processing unit 500 and displayed on appropriate remote devices. This information will be constantly updated with real-time information from the fire and occupant safety devices, so will be dynamic information and the fire and rescue authorities can proceed to evacuate and fight the fire as they determine is most appropriate.

In order for the processing unit 500 to complete the assessment of the fire risk and identify the appropriate policy response, it is necessary for the processing unit to create current-state and probabilistic-state virtual (i.e., computer-generated) models of high accuracy to simulate the fire; this is achieved by means of CFD applications, to which the processing unit has access; we will now provide a high-level overview of this process.

Figure 8:
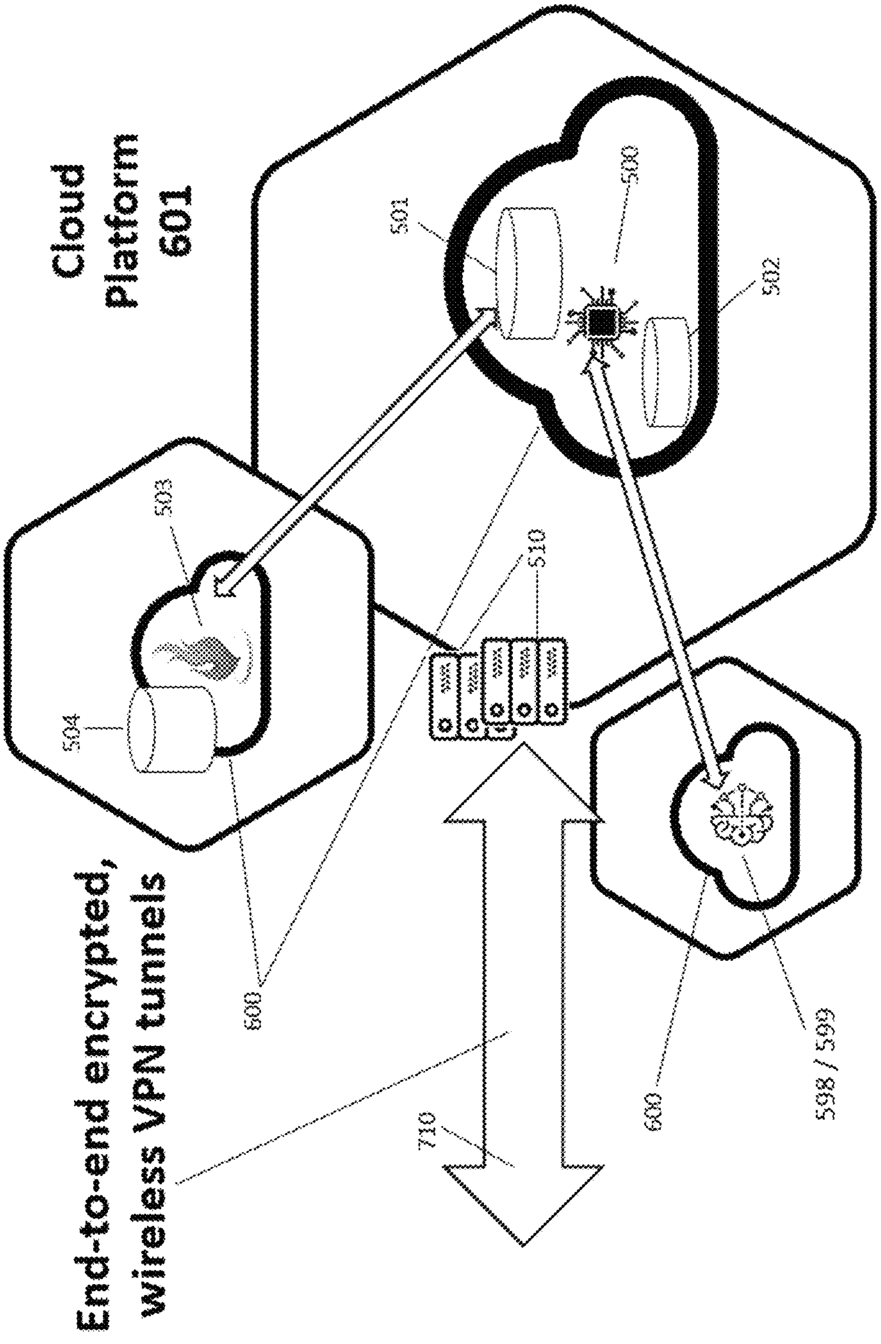
FIG. 8 illustrates an exemplary architecture for the probabilistic modelling of a fire, based on data received from the Appliances

As illustrated by FIG. 8, the processing unit 500 would access a memory 501 comprising; the building layout; its construction methods and materials (which will have been uploaded previously, as a result of a detailed physical survey of the building); reference data including thermal conductivity, thermal resistance and specific heat capacity of said materials. To this data would be added the dynamic information on the fire, such as heat flux, temperature, smoke density, presence and levels of various gases and all this information would be applied to CFD software components 503 to provide a detailed current-state and probabilistic model of the fire. CFD packages which might be used include SOFIE, CRISP, JASMINE. Such software might reference algorithms such as the Cellulosic Fire Curve (ISO 834) as part of their calculation process.

In preferred embodiments of the CFD software, the modelling code is made up of two main components; the CFD code itself, which is concerned with the basic transport mechanisms of energy, momentum and mass and the Fire Model, which involves the boundary conditions and the representation of combustion, including the chemical components of the process. Added to this are algorithms, stored in a memory 504, which can model the release and combustion of toxic gases liberated by pyrolysis during a fire and which represent a major component of heat and mass transfer. Some CFD codes, such as CRISP, also have algorithms which simulate human behaviour in a fire emergency and are ideal for "what if" modelling of firefighting interventions, since the impact of the proposed interventions on the fire and on the behaviour of the occupants can be simulated.

Supplementary information on the presence of various toxic or flammable gases produced by the fire will also aid the CFD software 503 to predict and alert users to key threats such as "Rollover" and "Flashover", described earlier.

An important aspect of the overall invention is for one or more of the detectors 100, 200, 300 to continue to provide monitoring of the fire in real-time, to aid the construction of dynamic virtual models of the fire; given the high ambient temperatures in the immediate vicinity of a building fire (which can reach up to 1,000° C.) this can, in practical terms, only be achieved by one of two means.

Firstly, the detectors could have some thermal survivability built in, as previously described, which would enable them to survive in high ambient temperatures and continue to report data; however, even in the case of suitably treated devices there is a practical limit, typically 500° C., to the temperatures at which the electronic components can continue to function. It is also the case that it would be very expensive to treat all detectors in a building with suitable heat resistant coatings and untreated detectors could be those closest to a fire, leaving them vulnerable to temperatures above 100° C. This opens up the need for a second way to measure extreme temperature of a fire; temperature inference.

Temperature inference refers to the estimation of the temperature within a compartment in which a fire is present, from a position outside the compartment and wherein the measurements of the outer walls of said compartment are contactless. This is typically achieved by measuring, by means of thermal sensors placed outside the compartment, the heat flux emanating from the outer surface of the wall, the inner surface of which faces into the compartment in which the fire is located.

As previously stated, there are various equations which link the heat flux of an outer surface, the temperature of said outer surface (both of which can be measured from outside the compartment) and the thermal resistance of the materials in the wall, to the temperature of the inner surface of the wall which is being heated by the fire in what is known as "transient (or unsteady) state heat transfer"; this enables the deduction of an accurate estimate of the temperature of the interior of the compartment by means of a relatively straightforward process of re-arranging and solving certain equations.

FIG. 9 provides an illustration and reference to this process; this would enable an accurate estimation of the heat of a fire in a specific location of the building based on the measurement of heat near to the fire, but away from the extreme temperatures of the fire. The foregoing algorithms and process could be stored in the memory 504, along with information on the materials in the vicinity and relevant reference data; this memory is accessed by the CFD software 503, which has the capability to simulate thermo-chemical processes relating to said materials and temperatures; the overall result will be to improve the accuracy of the construction of probabilistic fire models.

It is a key aspect of this invention that the benefits of Artificial Intelligence (AI) are employed to improve the development and interpretation of probabilistic modelling of a fire hazard; to this end, in preferable embodiments, the AI within the processing unit 500 requires "training."

This would be achieved by the processing unit being configured to simulate fires, in buildings to which it has access to a memory of the layout (memory storage 502), using various simulated information such as might be provided by detectors 100, 200, 300. This data could be pre-determined and pre-loaded, further the simulation of the location and spread of the fire could be randomised so as to simulate different aspects of a possible fire hazard. Variable patterns of occupant distribution and behaviour could also be randomised and simulated. Pre-determined firefighting interventions could also be pre-loaded and incorporated into the different simulations. It is especially important to note that these simulations would, in preferable embodiments, be continuously run in the "background" by the processing unit 500 during non-emergency conditions; this would enable the ML components 598 and AI components 599 linked to the processing unit 500 to recognise and interpret the behaviour of thousands of different virtual fires, under slightly different circumstances, within the same building and build up a "virtual experience" of how fire would affect a given building.

The virtual experience built up by the AI, as described above, would enhance the accuracy of the probabilistic modelling, especially in relation to the proactive or reactive simulation of firefighting interventions, in the event of an actual fire being detected.

FIG. 8 is an exemplary illustration of the overall configuration and architecture of the components 500, 501, 502, 503, 504, 510, 598, 599, 600 and 710, collectively the "Cloud Platform" 601.

General Method:

Generally, the system is configured according to a predetermined policy which defines, for example, the criteria for different alert and evacuation protocols to be implemented for different assessed fire hazards. Therefore, the system may implement an evacuation strategy, for example by activating selected alarms in sequence, according to the predetermined policy and the hazard status, as determined by the processing of data from the sensors and the current-state and probabilistic models constructed by the processor. Data defining the predetermined policy may be stored in a local memory in one or more devices within the system or may be stored remotely for example, accessible from the cloud via the internet.

A policy defining the criteria for notification and evacuation of the building will be agreed with the Building Responsible Authority. This will determine which specific actions are instructed to the remote devices and in which situations the occupants are notified and evacuated from the building by communicating the safe route out of the building. This will establish whether, for example, all alarms go off in a building on the detection of one fire in one residence, or whether there is an "escalating threat chain" which can be monitored and responded to, in line with safe evacuation policies.

One such policy might be (1) in the event of a fire in a residence, verify the fire through multiple sensors, automatically alert (a) emergency services, (b) residence occupants (c) occupants of adjoining residences (d) Building Owner/Responsible Authorities, (2) in the event that the fire spreads to another residence (a) alert all residents on that floor or (b) alert residents on a floor-by-floor basis or even (c) alert the whole building simultaneously. There may be different policies and the response might be different for a fire which starts in a communal area (which may escalate quicker). It may also be different for different times of day (for example, a residential fire between 11 pm and 7 am has a fatality rate 3.5 times higher than a fire at any other time, so there may be a time-dependent aspect to the policy in question).

In prior art fire safety systems, it has been deemed unsuitable to fit communal alarms in purpose-built residential blocks of flats, especially those in public sector ownership; this is because it is accepted, generally, that the dangers to the occupants of a potential mass panic and evacuation in an MRHR fire outweigh the dangers of staying put. The present invention in which a particular policy may be pre-programmed into the system ensures that alarms can be configured to alert in a phased, escalated chain depending on the parameters of the fire (for example, a catastrophic event might go straight to mass alerts, although these are thankfully rare). In general, the policy is likely to be set such that alarms cannot be activated automatically across a building just because of one fire in one residence.

Figure 10A:
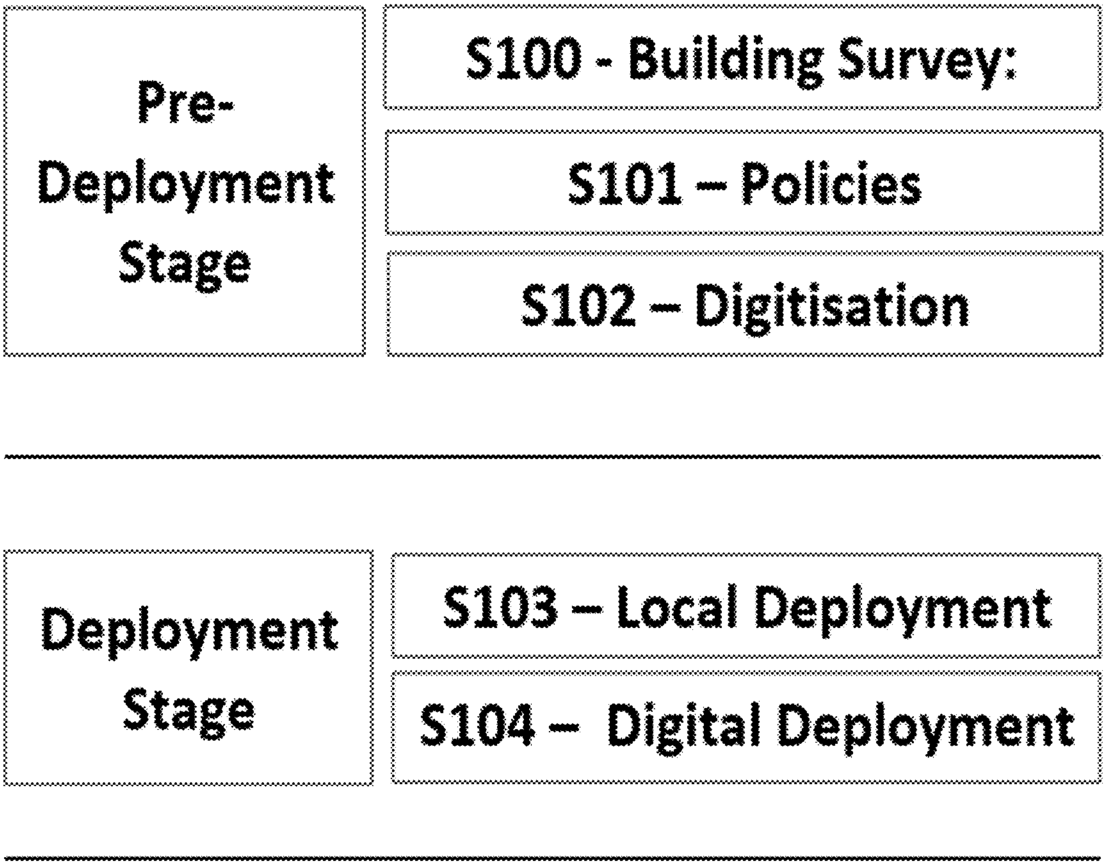

FIGS. 10A and 10B are flow charts setting out the main steps of a method according to the first aspect of the invention. The method of the invention comprises three stages; firstly, the pre-deployment stage which involves surveys and policy document creation; secondly, the deployment stage wherein the Appliances and digital architecture is deployed; thirdly, the post-deployment (operational) stage, wherein there are two possible operating scenarios or "branches" of a decision-tree, namely a non-emergency scenario and a fire emergency scenario.

Pre-Deployment Stage (FIG. 10A):

At step S100, a detailed building survey is performed; preferably, this will include, but not be limited to, an annotated representation of the building in the form of plans with details of the construction method of the compartments, the materials used, details on the space between compartments, floors and ceilings and what materials are found to be present, airflow and ventilation equipment, water, electrical and gas pipes and conduits, and data on the supporting structure of the building. Preferably this survey will be conducted by persons who are experts in construction (e.g., surveyors, who can prepare a report on the construction methods and materials) and also experts in fire safety, who can provide insight into the layout of the building from a fire safety perspective; this could be especially important in terms of identifying areas of particularly high risk in the event of a fire, which may need to be highlighted when the information is digitised in step S102.

At step S101, the Responsible Authority for the building will prepare alert, evacuation and privacy policies based on different fire hazard classifications and on certain key metrics of a fire hazard, which will include metrics such as temperature of a fire or compartment, rate of change of said temperature, level of toxic gases and smoke, location of the fire (compartment of origin, floor of origin etc), taking into account "dynamic" metrics such as probabilistic models of the development of the fire, or the location or behaviour of the occupants; preferably, the design of this step will be taken with advice and input from Fire and Rescue Services, Health & Safety personnel and other subject matter experts.

At step S102, the output from steps S100 and S101 will be digitised, i.e., uploaded to a computer memory in electronic form (preferably in the Cloud), and to this memory will be added reference data on the thermal properties (such as combustion temperature, thermal resistance, thermal conductivity, chemical decomposition during combustion, products of pyrolysis) of all materials referenced in the step S100 and the known effects of heat on said materials; this information is widely available from many reference sources. The output of step S102 is a dynamic (in the sense of being capable of being changed in real-time) digital, three-dimensional "blueprint" of the building; its utility supply configurations; its construction data, which can be updated in real-time with local data captured at source in later steps, and which can reference said data on the thermal properties of the building and the fire hazard policy described in step S101. This model is ready for the incorporation of occupant location and distribution data in later steps.

Deployment Stage (FIG. 10A):

At step S103, the Appliances will be installed (the fire and safety occupant devices incorporating, at a minimum; one or more thermal sensors, one or more carbon dioxide sensors, voice and data communication components), together with a communications hub (which may be incorporated in one or more of the Appliances) in accordance with fire safety instructions from a competent fire authority and the agreement of the Responsible Authority for the building. The Appliances and other devices will be tested for working order and for connectivity to a computing platform and each other.

At step S104, the digital deployment will occur in the cloud; the processing unit will be created, with all computational resources necessary including one or more virtual processors and one or more memories and associated networking resources in which reside; a digital representation of the building as described in step S102; Computational Fluid Dynamic ("CFD") software and algorithms; thermal and combustion data relating to the building materials and construction methods of step S102; Machine Learning and Artificial Intelligence tools. Collectively, these resources are known as the "Fire Modelling Platform".

Post-Deployment (Operational) Stage (FIG. 10B):

At step S105, the Appliances arranged throughout the building start to capture measurements of body heat and carbon dioxide levels in their vicinity; this information concerning the whereabouts and number of occupants in the building is continuously updated to a processor capable of incorporating the occupant location information into the digitised building layout as described in step S102, on a real-time basis; the processor references a memory in which is stored a privacy policy pre-agreed between the Responsible Authority and the building occupants, which in most cases will preclude the display of body heat information on any user device in the absence of a detected fire emergency.

The capture of information regarding occupant location and distribution, in non-emergency and/or fire emergency situations, is the single most important aspect of the method of the invention and is fundamental to the processes which follow. There are two "branches" of the method of the invention which follow from this fact; the first branch of the method of the invention involves non-emergency scenarios and the second branch of the method of the invention involves a fire emergency, i.e., the detection of the presence or risk of fire by one or more Appliances.

At step 106, being a scenario in which no fire is detected, i.e., a non-emergency scenario, the Appliances use both types of sensor (thermal and carbon dioxide) and any supplementary sensors to establish, on a continual basis, the location of all occupants of the building and the conditions within the building.

At step S107, the information captured in step S106 is passed, on a continual basis, to the central processor ("processing unit") and overlaid onto a dynamic digital blueprint of the building, i.e., the output as described in step S102.

At step S108, the information ingested by the processing unit as per step S107 will be compared to a privacy policy stored within a memory; this ensures the display of occupant location and distribution in line with the privacy policy for a non-emergency situation which, as previously stated, will in most cases preclude the display of said information on any user device (i.e., the information will be used, in the method of the invention, solely for purposes as set out in step S109 and not displayed to any human observer, on any device). This is the "default" operating condition for the method of the invention; notwithstanding the foregoing, it should be noted that if the privacy policy does allow for the display of occupant location in a non-emergency situation (for example, if the building in question was a prison), then that is perfectly acceptable to the method of the present invention.

At step S109, which is the "default" operating condition of the method of the present invention, there are two main processes to be continually performed by the processing unit; firstly, the data on the location and distribution of the occupants obtained by thermal, carbon dioxide and supplementary sensors are continually cross-referenced against each other by the central processor, meaning that for a given number of detected heat signals, in a given vicinity of the building, with varying conditions of airflow and ventilation, a dynamic "map" with various tolerances and parameters of the carbon dioxide levels can be modelled for a given number of persons, detected with certainty according to their body heat signals. This is important because although the body heat signatures will not vary with local conditions (they are either present, or they are not), the same is not true of carbon dioxide levels which can vary even when the number of people present is constant, due to factors involving ventilation etc, and it is necessary for the processor to apply Machine Learning techniques to this data to ensure that, in the case of a situation where the body heat reading is obscured or impaired (such as a child hiding wrapped in bedclothes), the interpretation of the respiratory carbon dioxide output is as accurate as possible; secondly, it is important for the Artificial Intelligence within the processor to simulate fires, digitally, even when no such fire exists in reality, in order to "hone" and improve the accuracy of the probabilistic models of the development of the fire and pre-determined firefighting interventions (as may be required later in steps S111 and S112), wherein the ability for the AI to make appropriate recommendations on the probabilistic models, in the event of a real fire, is enhanced by constant "training" using real data on the building and occupants, in simulation.

In the event of no fire ever being detected at the building, the method of the present invention remains permanently at step S109; in the event of a fire in the building, the method of the present invention adds the following additional steps S110 to S115.

At step S110, data relating to the presence or risk of fire ("fire data") is obtained by one or more said fire and occupant safety devices ("Appliances") throughout a building; additionally, data obtained by one or more of said Appliances relating to the presence of occupants ("occupant data") is captured by said Appliances (as per step S106, already described). The plurality of Appliances is arranged in a meshed network. This data may be used to detect the presence or risk of a fire and the presence of one or more people, dependent on the sensed temperature and carbon dioxide levels. Supplementary data may be obtained from one or more additional sensors, for example sensors configured to detect the presence of smoke, carbon monoxide, other toxic gases, airflow, oxygen, RFID tags.

The fire data may be initially analysed within a particular Appliance (e.g., by a local processor that detects that the temperature or carbon dioxide levels are above a predetermined threshold); the output of this analysis may be communicated directly to other Appliances in the meshed network; on receipt of the notification, the fire safety devices within the meshed network may each actuate a local alarm sounder or perform a mitigating action (e.g., shutting down a mains supply).

At step S111, the data obtained by the Appliances is communicated immediately and continuously, via the communications hub, to the processing unit, a computing platform typically hosted in a distributed computing system, e.g., the Cloud. The processing unit, upon receipt of information indicative of a fire, accesses the Fire Modelling Platform of step S104, into which is incorporated the output of the cumulative fire simulations of step S109. The communications in this step are preferably via a communications hub incorporated in one or more Appliances, but each Appliance may also have "failover" connectivity to the processing unit, in the event that connectivity between the hubs and the processing unit is lost.

At step S112, the processing unit incorporates the tools, resources and data of step S111 with the fire data and occupant data of step S110 to create a current-state model and probabilistic model (collectively, the "Fire Models") of the likely development of the fire and the location and likely behaviour of the occupants; furthermore, the central processor calculates the optimal escape route for the occupants, taking the output of the Fire Models into account.

At step S113, the processing unit calculates an assessed "Threat Level" of the Fire Models of step S112 and takes the following two steps simultaneously; firstly, the processing unit cross-references the said Threat Level with the alert and evacuation policies of step S101, so as to determine the appropriate policy response for alert and evacuation of the occupants (such a policy may also include a range of pre-determined firefighting interventions which the central processor may then be instructed to incorporate into the Fire Models); secondly, the processing unit cross-references the said Threat Level with the privacy policy of step S108 to determine the extent and scope of what information may be displayed on remote or other user devices for the duration of the emergency.

The output of the steps S112 and S113 continually evolve and vary in time for the duration of the fire emergency, based on the constantly varying information as described by step S110, which is a continuous process.

At step S114, the Fire Models as per step S112 and the recommended alert and evacuation output of step S113 are communicated, preferably via a virtual device in the cloud, to remote devices and authorised users, principally being; Fire and Rescue Services; other emergency services; the Responsible Authority and; such occupants as the policy indicates should be informed of the emergency, based on the Threat Level of the fire at any given time. At this step, the Fire & Emergency Services may, if so equipped, provide wearable or portable RFID tags to firefighter who are assigned to enter the building, in order that the location of said firefighters can then be detected by the Appliances and incorporated into the Fire Models.

For the purposes of step S114, the Fire Models are most likely to be displayed on a remote device (such as a laptop, tablet or smart phone) in the form of a real-time dynamic, digital representation of the building, the current-state and probabilistic state of the fire, the location of the occupants, the location of the firefighters and one or more recommended optimal safe evacuation routes. Even with this information, the Fire and Rescue service still lacks crucial medical data personal to the occupants, for example medical conditions (such as asthma, respiratory disease or mobility issues) which may alter the evacuation priorities indicated by the Fire Models; this brings in the final step S115.

At step S115, the Fire & Rescue Authorities communicate verbally with the occupants of the building (based on the priorities of the policy as set out in step S101 and in order of those occupants perceived to be in greatest threat from the fire), directly via the Appliances and establish by dialogue any medical conditions which may alter the evacuation plan. Furthermore, the Fire & Rescue authorities can communicate with all or some occupants via voice assistants such as Alexa®, if the building is so equipped, to establish the said medical information and/or broadcast safety instructions and evacuation routes.

The invention claimed is:

1. A computer-implemented method for processing fire safety and occupant safety information, comprising:

receiving, with a processing unit, communications containing data related to physical characteristics of a fire in a building and accessing a memory containing a physical layout of the building; and applying algorithms and machine learning, with the processing unit, to the data related to the physical characteristics of the fire in the building, and the physical layout of the building to construct with Computational Fluid Dynamics software, a virtual, dynamic, real-time computer model of a current state of the fire; and applying algorithms and machine learning, with the processing unit, to the data related to the physical characteristics of the fire in the building, and the physical layout of the building to construct with Computational Fluid Dynamics software, a virtual, dynamic, real-time probabilistic computer model of a predicted physical development and path of the fire in the building, over time; and applying the computer model of the current state of the fire and the computer model of the predicted physical development and path of the fire in the building to a pre-determined policy defining actions to be taken in response to different fire hazard scenarios, to determine an appropriate policy-based response, wherein the communications further comprise one or more proposed or pre-determined firefighting interventions and the method further comprises:

generating, with the processing unit, a simulated result of the proposed or pre-determined firefighting interventions; and incorporating the simulated result into the computer model of the predicted physical development and path of the fire in the building.

2. The method of claim 1, wherein the computer model of the current state of the fire and/or the computer model of the predicted physical development and path of the fire in the building incorporate information regarding first and second locations produced according to a computer-implemented method for determining fire safety and occupant safety information, comprising:

receiving data from a plurality of Appliances, the Appliances being devices equipped with thermal and carbon dioxide sensors and capability for real-time wireless voice and data communications, the Appliances arranged within the building and configured to detect locations of elevated temperature and/or locations of elevated levels of ambient carbon dioxide within the building; wherein one or more of the Appliances are arranged to detect elevated temperatures and/or elevated ambient carbon dioxide levels indicative of a presence or risk of fire and one or more of the Appliances are arranged to detect elevated temperatures indicative of body heat and/or elevated ambient carbon dioxide levels indicative of respiration and therefore a presence of one or more people; and analysing the received data to determine the first location corresponding to the presence or risk of fire and the second location corresponding to the presence of one or more people; and communicating data corresponding to the first and second locations.

3. The method of claim 2, further comprising determining a safe route through the building between the second location corresponding to the presence of one or more people and an exit of the building, avoiding the first location, and wherein the step of communicating data comprises communicating the determined safe route.

4. The method of claim 3, wherein the determination of a safe route comprises accessing a memory storing data comprising the physical layout of the building and the computer model of the current state of the fire and the computer model of the predicted physical development and path of the fire in the building.

5. The method of claim 3, wherein the step of communicating data comprises communicating the determined safe route to a remote device.

6. The method of claim 2, wherein the step of communicating data comprises communicating the first and second locations and the computer model of the current state of the fire and the computer model of the predicted physical development and path of the fire in the building to one or more remote devices.

7. The method of claim 2, further comprising displaying data relating to the first and second locations and/or the computer model of the current state of the fire and the computer model of the predicted physical development and path of the fire in the building, on one or more remote devices in a form of a real-time digital representation of the building.

8. The method of claim 2, further comprising communicating with a remote device to cause the remote device to perform an action in response to one or more of:

the first and second locations;

a determined safe route;

the simulated result of the proposed or pre-determined firefighting interventions; and/or a potential hazard.

9. The method of claim 8 comprising communicating with a remote device to instruct the remote device to perform one or more actions, where the actions are selected based on:

the first and second locations; and the computer model of the current state of the fire and the computer model of the predicted physical development and path of the fire in the building; and a pre-determined policy defining actions to be taken in different hazard scenarios.

10. The method of claim 2, further comprising receiving supplementary data from one or more of:

a smoke sensor;

a smoke density sensor;

a gas sensor;

a carbon monoxide sensor;

an airflow sensor;

an oxygen sensor;

a multi-gas sensor for detection of toxic gases;

and wherein the determination of the first location and the computer model of the current state of the fire and the computer model of the predicted physical development and path of the fire in the building is further based on an analysis of this supplementary data; and further comprising receiving supplementary data from one or more RFID (Radio Frequency Identification) antenna and readers, configured so as to track RFID tags worn, carried or installed on a remote device by certain persons within the building.

11. A non-transitory computer readable storage medium comprising executable instructions that when executed by a computer cause the computer to perform the method of claim 1.

12. A fire and occupant safety system configured to perform the method of claim 1.

13. The method of claim 1, wherein the memory further contains construction materials and/or construction methods of the building.

14. The fire and occupant safety system of claim 12, wherein the system is linked to one or more of: a third-party fire protection system; a building management system; and/or a building evacuation system.

15. The fire and occupant safety system of claim 12, configured to communicate the computer model of the current state of the fire and the computer model of the predicted physical development and path of the fire in the building to one or more remote devices.

* * * * *